(12) United States Patent
Kubota et al.

(10) Patent No.: US 8,715,864 B2
(45) Date of Patent: May 6, 2014

(54) ELECTROLYTIC SOLUTION AND BATTERY

(75) Inventors: Tadahiko Kubota, Kanagawa (JP); Hiroyuki Yamaguchi, Fukushima (JP); Masayuki Ihara, Fukushima (JP)

(73) Assignee: Sony Corporation, Tokyo (JP)

( * ) Notice: Subject to any disclaimer, the term of this patent is extended or adjusted under 35 U.S.C. 154(b) by 314 days.

(21) Appl. No.: 11/575,533

(22) PCT Filed: Sep. 21, 2005

(86) PCT No.: PCT/JP2005/017397
§ 371 (c)(1),
(2), (4) Date: Mar. 19, 2007

(87) PCT Pub. No.: WO2006/033358
PCT Pub. Date: Mar. 30, 2006

(65) Prior Publication Data
US 2008/0063946 A1 Mar. 13, 2008

(30) Foreign Application Priority Data
Sep. 22, 2004 (JP) .............................. P2004-274796

(51) Int. Cl.
*H01M 6/16* (2006.01)
(52) U.S. Cl.
USPC .......................................... 429/331; 429/338
(58) Field of Classification Search
USPC ................................................ 429/331, 338
See application file for complete search history.

(56) References Cited

U.S. PATENT DOCUMENTS

| 4,431,786 A * | 2/1984 | Squire ............................ 526/247 |
| 6,824,922 B2 * | 11/2004 | Park et al. ...................... 429/219 |
| 2002/0102464 A1 * | 8/2002 | Yoshida et al. ............... 429/300 |

FOREIGN PATENT DOCUMENTS

| JP | 05-325985 | 12/1993 |
| JP | 07-240232 | 9/1995 |
| JP | 10-189043 | 7/1998 |
| JP | 2000-223368 | 8/2000 |
| JP | 2001093572 A * | 4/2001 |
| JP | 2003-168480 | 6/2003 |
| JP | 2004-171875 | 6/2004 |
| JP | 2004-319317 | 11/2004 |

OTHER PUBLICATIONS

International Search Report dated Dec. 20, 2005.
Japanese Office Action dated Jul. 13, 2011 for Japanese Application No. 2006-536398.
Masafumi Kobayashi, et al., "Development of Direct Flouorination Technology for Application to Materials for Lithium Battery," Journal of Fluorine Chemisty 120 (2003) 105-110.
Japanese Office Action dated Jun. 12, 2012 issued in connection with counterpart JP Application No. 2006-536398.

* cited by examiner

*Primary Examiner* — Melissa Stalder
(74) *Attorney, Agent, or Firm* — Dentons US LLP

(57) ABSTRACT

An electrolytic solution and a battery capable of improving high temperature characteristics are provided. A separator (23) is impregnated with an electrolytic solution. The electrolytic solution includes a solvent including 4,5-difluoro-1,3-dioxolane-2-one. The content of 4,5-difluoro-1,3-dioxolane-2-one is preferably within a range from 5 wt % to 50 wt %, or in the case where 4,5-difluoro-1,3-dioxolane-2-one is mixed and used with 4-fluoro-1,3-dioxolane-2-one, the content of 4,5-difluoro-1,3-dioxolane-2-one is preferably within a range from 5 vol ppm to 2000 vol ppm.

30 Claims, 5 Drawing Sheets

ELECTROLYTIC SOLUTION AND BATTERY

TECHNICAL FIELD

The present invention relates to a battery and an electrolytic solution used in the battery.

BACKGROUND ART

In recent years, a large number of portable electronic devices such as laptop computers, cellular phones and camcorders have been emerged, and an attempt to reduce the size and the weight of them has been made. Accordingly, the development of lightweight secondary batteries capable of obtaining a high energy density as power sources of the electronic devices has been promoted. As a secondary battery capable of obtaining a high energy density, for example, a lithium secondary battery is well known.

In the lithium secondary battery, an anode is turned into a strong reducing agent in a charge state, so an electrolytic solution is easily decomposed in the anode, thereby a discharge capacity is reduced. Therefore, to improve battery characteristics such as cycle characteristics more than before, various studies of the compositions of electrolytic solutions have been conducted. For example, in one of the compositions, 4-fluoro-1,3-dioxolane-2-one is used (for example, refer to Japanese Unexamined Patent Application Publication No. H7-240232).

DISCLOSURE OF THE INVENTION

However, as the use of portable electronic devices increases, recently, the portable electronic devices are more often placed under high temperature conditions during transport or use, thereby a decline in battery characteristics due to placing them under high temperature conditions has been an issue. Therefore, the development of an electrolytic solution capable of improving not only cycle characteristics but also high temperature characteristics has been desired.

In view of the foregoing, it is an object of the invention to provide an electrolytic solution and a battery capable of improving high temperature characteristics.

An electrolytic solution according to the invention includes a solvent including 4,5-difluoro-1,3-dioxolane-2-one.

A battery according to the invention includes an electrolytic solution together with a cathode and an anode, wherein the electrolytic solution includes a solvent including 4,5-difluoro-1,3-dioxolane-2-one.

In the electrolytic solution according to the invention, 4,5-difluoro-1,3-dioxolane-2-one is included, so a decomposition reaction can be prevented even at high temperature. Therefore, for example, in the case where the electrolytic solution is used in a battery, high temperature storage characteristics and high temperature use characteristics can be improved, and even if the battery is left or used under high temperature conditions, superior characteristics can be obtained.

BEST MODE FOR CARRYING OUT THE INVENTION

Figure 1:
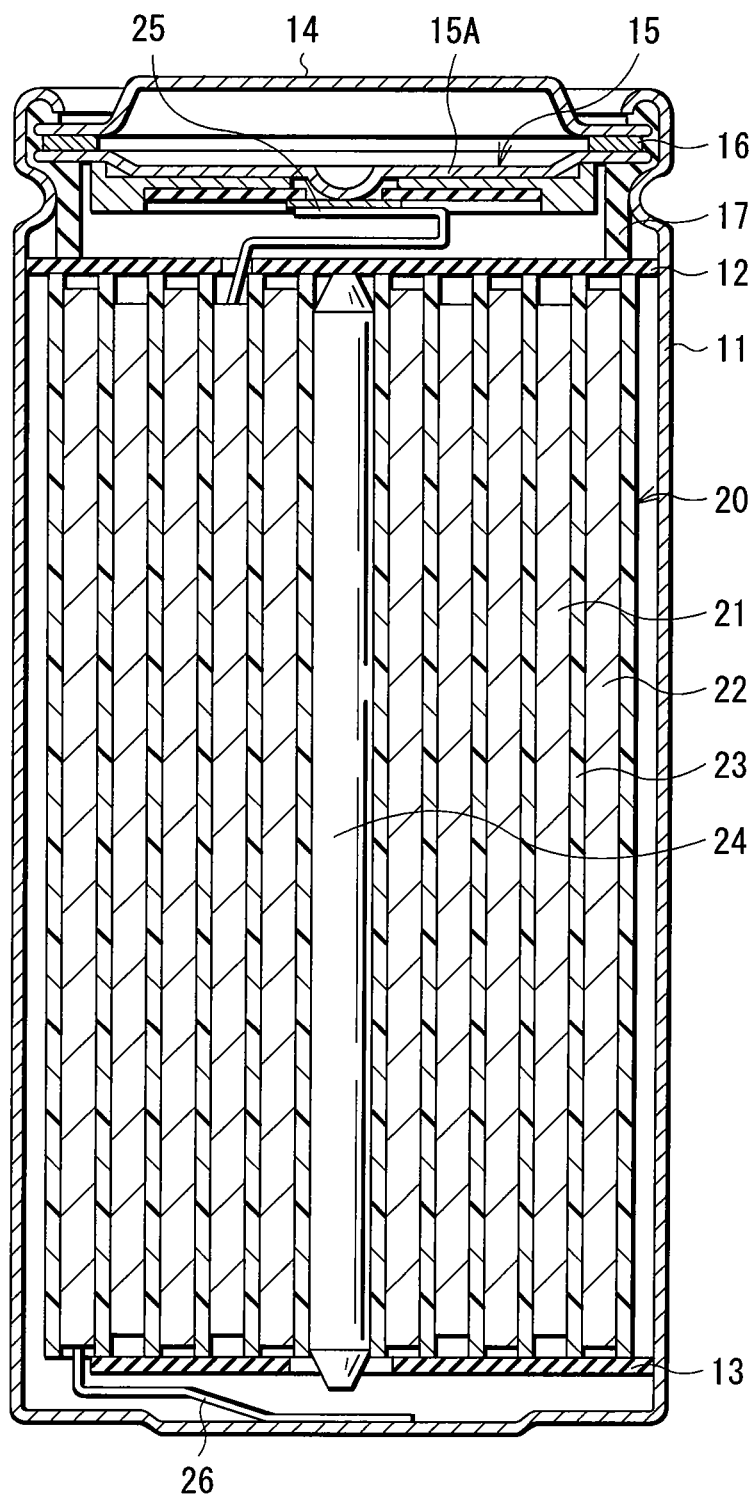
FIG. 1 is a sectional view of the structure of a first secondary battery using an electrolytic solution according to an embodiment of the invention.

A preferred embodiment will be described in detail below referring to the accompanying drawings.

An electrolytic solution according to an embodiment of the invention includes, for example, a solvent and an electrolyte salt dissolved in the solvent.

The solvent includes 4,5-difluoro-1,3-dioxolane-2-one shown in Chemical Formula 1(1). It is because when the solvent includes 4,5-difluoro-1,3-dioxolane-2-one, the decomposition reaction of the electrolytic solution can be prevented, and in particular, stability at high temperature can be improved. 4,5-difluoro-1,3-dioxolane-2-one may be a cis-isomer shown in Chemical Formula 1(2), that is, cis-4,5-difluoro-1,3-dioxolane-2-one or a trans-isomer shown in Chemical Formula 1(3), that is, trans-4,5-difluoro-1,3-dioxolane-2-one, or may include both of them. In particular, in the case where the content of 4,5-difluoro-1,3-dioxolane-2-one in the solvent is small, both of the cis-isomer and the trans-isomer are preferably included. It is because stability at high temperature can be further improved.

[Chemical Formula 1]

(1)

(2)

(3)

The solvent preferably includes one kind or two or more kinds of other solvents in addition to 4,5-difluoro-1,3-dioxolane-2-one. It is because ionic conductivity or the like can be improved.

Examples of the other solvents include ethylene carbonate, propylene carbonate, dimethyl carbonate, diethyl carbonate, ethyl methyl carbonate, 1,2-dimethoxyethane, 1,2-diethoxyethane, γ-butyrolactone, γ-valerolactone, tetrahydrofuran, 2-methyltetrahydrofuran, 1,3-dioxolane, 4-methyl-1,3-dioxolane, 1,3-dioxol-2-one, 4-vinyl-1,3-dioxolane-2-one, diethyl ether, sulfolane, methylsulfolane, tetramethylsulfolane, dialkylsulfolane, acetonitrile, propionitrile, N-methylpyrrolidone, N-methyloxazolidinone, acetate, trimethylacetate, butyrate, propionate or a nonaqueous solvent such as a carbonate derivative having a halogen atom.

Among them, another cyclic carbonate derivative having a halogen atom is preferably mixed and used. It is because an effect of preventing the decomposition reaction of the solvent is high. Examples of the cyclic carbonate derivative having a halogen atom include 4-fluoro-1,3-dioxolane-2-one shown in Chemical Formula 2(1), 4-chloro-1,3-dioxolane-2-one shown in Chemical Formula 2(2), 4-fluoro-4-methyl-1,3-dioxolane-2-one shown in Chemical Formula 2(3), trans-4-fluoro-5-methyl-1,3-dioxolane-2-one shown in Chemical Formula 2(4), and cis-4-fluoro-5-methyl-1,3-dioxolane-2-one shown in Chemical Formula 2(5), and specifically 4-fluoro-1,3-dioxolane-2-one is preferable. It is because a higher effect can be obtained.

[Chemical Formula 2]

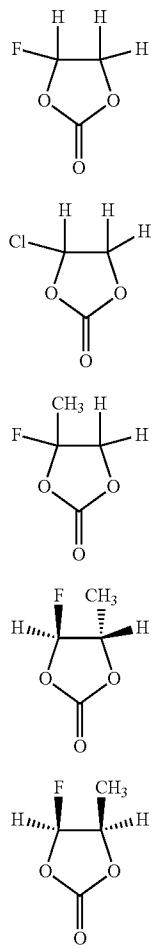

Moreover, a low-viscosity solvent having a viscosity of 1 mPa·s or less such as dimethyl carbonate, diethyl carbonate or methyl ethyl carbonate is preferably mixed and used. It is because higher ionic conductivity can be obtained.

The content of 4,5-difluoro-1,3-dioxolane-2-one is preferably within a range from 5 wt % to 50 wt % inclusive. It is because a higher effect can be obtained within the range.

Further, in the case where a mixture of 4,5-difluoro-1,3-dioxolane-2-one and 4-fluoro-1,3-dioxolane-2-one is used, the content of 4,5-difluoro-1,3-dioxolane-2-one in the solvent may be within a range from 5 vol ppm to 2000 vol ppm inclusive. It is because even if the content is very small, characteristics can be dramatically improved. In this case, the content of 4,5-difluoro-1,3-dioxolane-2-one in the solvent is more preferably within a range from 5 vol ppm to 500 vol ppm inclusive. It is because a higher effect can be obtained within the range.

Examples of the electrolyte salt include lithium salts such as lithium hexafluorophosphate ($LiPF_6$), lithium tetrafluoroborate ($LiBF_4$), lithium hexafluoroarsenate ($LiAsF_6$), lithium perchlorate ($LiClO_4$), lithium trifluoromethanesulfonate ($LiCF_3SO_3$), lithium bis[trifluoromethane sulfonyl]imide($(CF_3SO_2)_2NLi$), lithium tris(trifluoromethanesulfonyl)methide ($(CF_3SO_2)_3CLi$), lithium tris(pentafluoroethyl)trifluorophosphate ($LiP(C_2F_5)_3F_3$), lithium (trifluoromethyl)trifluoroborate ($LiB(CF_3)F_3$), lithium pentafluoroethyl trifluoroborate ($LiB(C_2F_5)F_3$), lithium bis(oxalato)borate, lithium difluoro(oxalato)borate, lithium bis[pentafluoroethane sulfonyl]imide($(C_2F_5SO_2)_2NLi$), lithium 1,1,2,2,3,3-hexafluoropropane-1,3-disulfonimide, lithium trifluoromethyl pentafluoropropyl imide, and lithium trifluoromethyl nonafluorobutyl imide. As the electrolyte salt, only one kind or a mixture of two or more kinds selected from them may be used.

The electrolytic solution is used in a secondary battery as will be described below.

(First Secondary Battery)

FIG. 1 shows a sectional structure of a first secondary battery using the electrolytic solution according to the embodiment of the invention. The secondary battery is a so-called lithium-ion secondary battery in which the capacity of an anode is represented by a capacity component by insertion and extraction of lithium as an electrode reactant. The secondary battery is a so-called cylindrical type, and includes a spirally wound electrode body 20 formed by spirally winding a strip-shaped cathode 21 and a strip-shaped anode 22 with a separator 23 in between in a substantially hollow cylindrical battery can 11. The battery can 11 is made of, for example, nickel (Ni)-plated iron (Fe), and an end portion of the battery can 11 is closed, and the other end portion is opened. A pair of insulating plates 12 and 13 are arranged so that the spirally wound electrode body 20 is sandwiched therebetween in a direction perpendicular to a peripheral winding surface.

In the opened end portion of the battery can 11, a battery cover 14 and, a safety valve mechanism 15 and a positive temperature coefficient device (PTC device) 16 disposed inside the battery cover 14 are mounted by caulking by a gasket 17, and the battery can 11 is sealed. The battery cover 14 is made of, for example, the same material as that of the battery can 11. The safety valve mechanism 15 is electrically connected to the battery cover 14 through the PTC device 16, and when internal pressure in the battery increases to a certain extent or higher due to an internal short circuit or external application of heat, a disk plate 15A is flipped so as to disconnect the electrical connection between the battery cover 14 and the spirally wound electrode body 20. When a temperature rises, the PTC device 16 limits a current by an increased resistance, thereby resulting in preventing abnormal heat generation by a large current. The gasket 17 is made of, for example, an insulating material, and its surface is coated with asphalt.

For example, a center pin 24 is inserted into the center of the spirally wound electrode body 20. A cathode lead 25 made of aluminum (Al) or the like is connected to the cathode 21 of the spirally wound electrode body 20, and an anode lead 26 made of nickel or the like is connected to the anode 22. The cathode lead 25 is welded to the safety valve mechanism 15 so as to be electrically connected to the battery cover 14, and the anode lead 26 is welded and electrically connected to the battery can 11.

Figure 2:
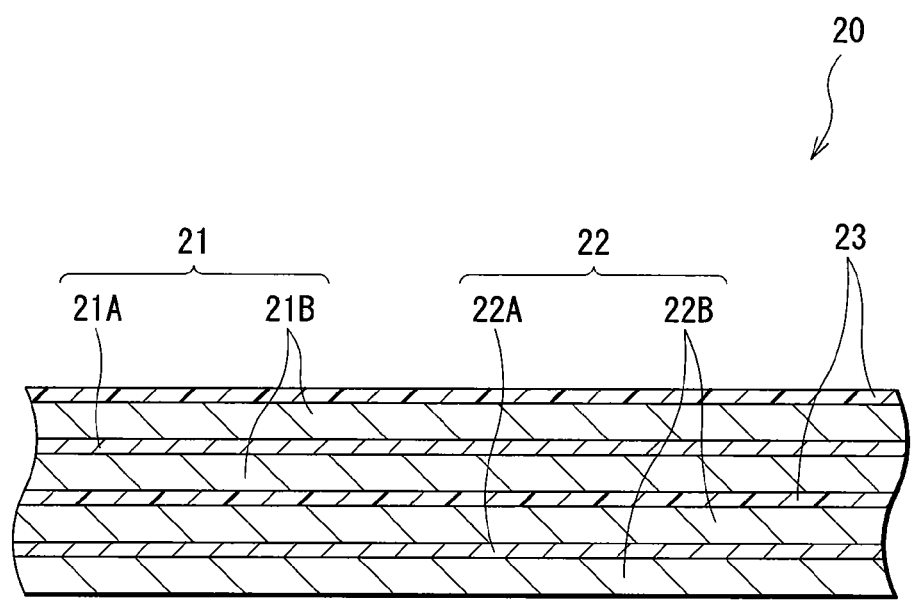
FIG. 2 is a partially enlarged sectional view of a spirally wound electrode body in the secondary battery shown in FIG. 1.

FIG. 2 is a partially enlarged view of the spirally wound electrode body 20 shown in FIG. 1. The cathode 21 has a structure in which a cathode active material layer 21B is arranged on both sides or one side of a cathode current collector 21A having a pair of facing surfaces. The cathode current collector 21A is made of, for example, metal foil such as aluminum foil, nickel foil or stainless foil.

The cathode active material layer 21B includes, for example, one kind or two or more kinds of cathode materials capable of inserting and extracting lithium as cathode active materials, and may include an electrical conductor such as a carbon material and a binder such as polyvinylidene fluoride, if necessary. As the cathode material capable of inserting and extracting lithium, for example, a lithium-containing metal complex oxide represented by a general formula $Li_xMIO_2$ is preferable. It is because the lithium-containing metal complex oxide is capable of generating high voltage and obtaining a high energy density. In the formula, MI represents one or more kinds of transition metals, and, for example, MI is preferably at least one of cobalt (Co) and nickel. In the formula, the value of x depends upon a charge-discharge state of the battery, and is generally within a range of $0.05 \leq x \leq 1.10$. Specific examples of such a lithium-containing metal complex oxide include $LiCoO_2$, $LiNiO_2$ and the like.

The anode 22 has a structure in which an anode active material layer 22B is arranged on both sides or one side of an anode current collector 22A having a pair of facing surfaces. The anode current collector 22A is preferably made of a metal material including at least one kind of a metal element not forming an intermetallic compound with lithium. When the anode current collector 22A forms an intermetallic compound with lithium, expansion and shrinkage of the anode current collector 22A occur according to charge and discharge to cause structural damage, thereby in addition to a decline in a current collecting property, an ability of supporting the anode active material layer 22B is reduced, so the anode active material layer 22B is easily removed from the anode current collector 22A. In this description, the metal material includes not only the simple substance of a metal element but also an alloy including two or more kinds of metal elements and an alloy including one or more kinds of metal elements and one or more kinds of metalloid elements. Examples of the metal element not forming an intermetallic compound with lithium include copper (Cu), nickel, titanium (Ti), iron and chromium (Cr).

The anode active material layer 22B includes, for example, one kind or two or more kinds of anode materials capable of inserting and extracting lithium as anode active materials. Examples of the anode material capable of inserting and extracting lithium include a material including tin (Sn) or silicon (Si) as an element. It is because tin and silicon have a high capability to insert and extract lithium, and can obtain a high energy density. More specifically, for example, a simple substance, an alloy or a compound of silicon, or a simple substance, an alloy or a compound of tin, or a material including a phase including one kind or two or more kinds of them at least in part is cited.

As a tin alloy, for example, a tin alloy including at least one kind selected from the group consisting of silicon, nickel, copper, iron, cobalt, manganese (Mn), zinc (Zn), indium (In), silver (Ag), titanium, germanium (Ge), bismuth (Bi), antimony (Sb) and chromium as a second element in addition to tin is cited. As a silicon alloy, for example, a silicon alloy including at least one kind selected from the group consisting of tin, nickel, copper, iron, cobalt, manganese, zinc, indium, silver, titanium, germanium, bismuth, antimony and chromium as a second element in addition to silicon is cited.

As a compound of tin or silicon, for example, a compound including oxygen (O) or carbon (C) is cited, and in addition to tin or silicon, the compound may include the above-described second element. As such an anode material, for example, a CoSnC-containing material including tin, cobalt and carbon is cited.

As the anode material capable of inserting and extracting lithium, for example, a material including any other metal element or any other metalloid element capable of forming an alloy with lithium can be used. As such a metal element or such a metalloid element, magnesium (Mg), boron (B), aluminum, gallium (Ga), indium, germanium, lead (Pb), bismuth, cadmium (Cd), silver, zinc, hafnium (Hf), zirconium (Zr), yttrium (Y), palladium (Pd) or platinum (Pt) is cited.

The anode active material layer 22B may be formed by a vapor-phase deposition method, a liquid-phase deposition method, a spraying method or a firing method, or by coating. The firing method is a method of mixing a particulate anode active material with a binder or the like to form a mixture, dispersing the mixture in a solvent, coating with the mixture, and then heating the mixture at a temperature higher than the melting point of the binder or the like. In the case where the anode active material layer 22B is formed by the vapor-phase deposition method, the liquid-phase deposition method, the spraying method or the firing method among them, the anode active material layer 22B is preferably alloyed with the anode current collector 22A in at least a part of an interface with the anode current collector 22A. More specifically, it is preferable that an element of the anode current collector 22A is diffused into the anode active material layer 22B, or an element of the anode active material layer 22B is diffused into the anode current collector 22A, or they are diffused into each other at an interface therebetween. It is because damage due to expansion and shrinkage of the anode active material layer 22B according to charge and discharge can be prevented, and electronic conductivity between the anode active material layer 22B and the anode current collector 22A can be improved.

Moreover, in the case where the anode active material layer 22B is formed by coating, in addition to the anode active material, a binder such as polyvinylidene fluoride and another material such as an electrical conductor may be included. The same goes for the case where the anode active material layer 22B is formed by the firing method.

As the anode active material, a carbon material such as graphite, non-graphitizable carbon or graphitizable carbon may be used, or the carbon material and the above-described anode material may be used together. In the carbon material, a change in a crystal structure according to insertion and extraction of lithium is very small, and, for example, the carbon material is preferably used with the above-described material, because a high energy density and superior cycle characteristics can be obtained, and the carbon material functions as an electrical conductor.

The separator 23 isolates the cathode 21 from the anode 22 to pass lithium ions therethrough while preventing a short circuit of current due to contact between the cathode 21 and the anode 22. The separator 23 is made of, for example, a porous film of a synthetic resin such as polytetrafluoroethylene, polypropylene or polyethylene, or a porous ceramic film, and the separator 23 may have a structure in which two or more kinds of the porous films are laminated.

The separator 23 is impregnated with the electrolytic solution according to the embodiment.

For example, the secondary battery can be manufactured by the following steps.

At first, for example, the cathode active material layer 21B is formed on the cathode current collector 21A to form the cathode 21. The cathode active material layer 21B is formed, for example, by mixing cathode active material powder, the electrical conductor and the binder to form a cathode mixture, dispersing the cathode mixture in a solvent such as N-methyl-2-pyrrolidone to form paste-form cathode mixture slurry, coating the cathode current collector 21A with the cathode mixture slurry, and drying and compression molding the cathode mixture slurry.

Moreover, the anode active material layer 22B is formed on the anode current collector 22A to form the anode 22. The anode active material layer 22B may be formed, for example, by any of the vapor-phase deposition method, the liquid-phase deposition method, the firing method or coating, or a combination of two or more selected from them. In the case where the anode active material layer 22B is formed by the vapor-phase deposition method, the liquid-phase deposition method or the firing method, at the time of formation, in some cases, the anode active material layer 22B and the anode current collector 22A are alloyed in at least a part of an interface therebetween; however, they may be alloyed by a heat treatment in a vacuum atmosphere or a non-oxygenated atmosphere.

As the vapor-phase deposition method, for example, a physical deposition method or a chemical deposition method is used, and more specifically, a vacuum deposition method, a sputtering method, an ion plating method, a laser ablation method, a thermal CVD (Chemical Vapor Deposition) method, a plasma CVD method or the like can be used. As the liquid-phase deposition method, a known method such as an electrolytic plating method or an electroless plating method can be used. As the spraying method, a plasma spraying method, a high-speed gas flame spraying method, an arc spraying method or the like may be used. As the firing method, a known technique such as, for example, an atmosphere firing method, a reaction firing method or a hot press firing method can be used. In the case of coating, the anode 22 can be formed as in the case of the cathode 21.

Next, the cathode lead 25 is attached to the cathode current collector 21A by welding or the like, and the anode lead 26 is attached to the anode current collector 22A by welding or the like. Next, the cathode 21 and the anode 22 are spirally wound with the separator 23 in between, and an end of the cathode lead 25 is welded to the safety valve mechanism 15, and an end of the anode lead 26 is welded to the battery can 11, and the cathode 21 and the anode 22 which are spirally wound are sandwiched between a pair of insulating plates 12 and 13, and are contained in the battery can 11. After the cathode 21 and the anode 22 are contained in the battery can 11, the electrolytic solution is injected into the battery can 11 so that the separator 23 is impregnated with the electrolytic solution. After that, the battery cover 14, the safety valve mechanism 15 and the PTC device 16 are fixed in an opened end portion of the battery can 11 by caulking by the gasket 17. Thereby, the secondary battery shown in FIG. 1 is completed.

When the secondary battery is charged, for example, lithium ions are extracted from the cathode 21, and are inserted into the anode 22 through the electrolytic solution. When the secondary battery is discharged, for example, the lithium ions are extracted from the anode 22 and are inserted into the cathode 21 through the electrolytic solution. At this time, the electrolytic solution includes 4,5-difluoro-1,3-dioxolane-2-one, so the decomposition reaction of the electrolytic solution is prevented, and specifically characteristics at high temperature are improved. Moreover, in the case where a simple substance, an alloy or a compound of a metal element capable of inserting and extracting lithium or a simple substance, an alloy or a compound of a metalloid element capable of inserting and extracting lithium is used as the anode active material, the activity of the anode 22 is higher; however, by the use of the electrolytic solution, the decomposition reaction is effectively prevented.

Thus, in the embodiment, the electrolytic solution includes 4,5-difluoro-1,3-dioxolane-2-one, so the decomposition reaction of the electrolytic solution can be prevented at not only room temperature but also high temperature. Therefore, for example, in the case where the electrolytic solution is used in a battery, cycle characteristics can be improved, and high temperature storage characteristics and high temperature use characteristics can be improved. Therefore, even if the battery is left or used under high temperature conditions, superior characteristics can be obtained.

In particular, when the content of 4,5-difluoro-1,3-dioxolane-2-one in the solvent is within a range from 5 wt % to 50 wt % inclusive, a higher effect can be obtained.

Moreover, in the case where in addition to 4,5-difluoro-1,3-dioxolane-2-one, 4-fluoro-1,3-dioxolane-2-one is mixed and used, when the content of 4,5-difluoro-1,3-dioxolane-2-one in the solvent is within a range from 5 wt % to 50 wt % inclusive, a higher effect can be obtained.

(Second Secondary Battery)

A second secondary battery is a so-called lithium metal secondary battery in which the capacity of the anode 22 is represented by a capacity component by precipitation and dissolution of lithium as an electrode reactant. The secondary battery has the same structure as that of the first secondary battery, except that the anode active material layer 22B is made of lithium metal, and the secondary battery can be manufactured as in the case of the first secondary battery. Therefore, the second secondary battery will be described referring to FIGS. 1 and 2, and like components are denoted by like numerals as of the first secondary battery, and will not be further described.

More specifically, in the secondary battery, lithium metal is used as an anode active material, thereby a high energy density can be obtained. The anode active material layer 22B may be formed before assembly, or the anode active material layer 22B may be not formed at the time of assembly, and may be formed of lithium metal precipitated at the time of charge. Moreover, the anode active material layer 22B may be also used as a current collector, and the anode current collector 22A may be removed.

When the secondary battery is charged, for example, lithium ions are extracted from the cathode 21, and are precipitated on a surface of the anode current collector 22A as lithium metal through the electrolytic solution. When the secondary battery is discharged, for example, lithium metal is eluted from the anode active material layer 22B as lithium ions, and is inserted into the cathode 21 through the electrolytic solution. Thus, in the secondary battery, the precipitation and dissolution of lithium are repeated in the anode 22, so the activity of the anode 22 is very high; however, the electrolytic solution includes 4,5-difluoro-1,3-dioxolane-2-one, so the decomposition reaction of the electrolytic solution can be prevented at not only room temperature but also high temperature.

(Third Secondary Battery)

In a third secondary battery, the capacity of an anode includes a capacity component by insertion and extraction of lithium as an electrode reactant and a capacity component by precipitation and dissolution of lithium, and is represented by the sum of them. The secondary battery has the same structure as that of the first secondary battery, except that the anode active material layer 22B has a different structure, and the secondary battery can be manufactured as in the case of the first secondary battery. Therefore, the third secondary battery will be described referring to FIGS. 1 and 2, and like components are denoted by like numerals as of the first secondary battery, and will not be further described.

The anode active material layer 22B includes one kind or two or more kinds of anode materials capable of inserting and extracting lithium as anode active materials, and may include a binder, if necessary. Examples of such anode materials include a carbon material described in the first secondary battery, a simple substance, an alloy or a compound of a metal element capable of inserting and extracting lithium, and a simple substance, an alloy or a compound of a metalloid element capable of inserting and extracting lithium. The carbon material is preferably used among them, because superior cycle characteristics can be obtained.

The amount of the anode material capable of inserting and extracting lithium is adjusted so that the charge capacity by the anode material becomes smaller than the charge capacity of the cathode 21. Thereby, in the secondary battery, in a charging process, lithium metal starts to be precipitated on the anode 22 at the time when an open circuit voltage (that is, a battery voltage) is lower than an overcharge voltage.

The overcharge voltage means an open circuit voltage at the time when the battery turns to an overcharge state, and indicates, for example, a voltage higher than the open circuit voltage of a battery "fully charged" described in and defined by "Guideline for safety assessment of lithium secondary batteries" (SBA G1101) which is one of guidelines drawn up by Japan Storage Battery industries Incorporated (Battery Association of Japan). In other words, the overcharge voltage indicates a higher voltage than an open circuit voltage after charge by using a charging method used when a nominal capacity of each battery is determined, a standard charging method or a recommended charging method. In the case where the secondary battery is fully charged, for example, at an open circuit voltage of 4.2 V, the lithium metal is precipitated on a surface of the anode material capable of inserting and extracting lithium in a part of the range of the open circuit voltage from 0 V to 4.2 V. Therefore, in the secondary battery, both the anode material capable of inserting and extracting lithium and lithium metal function as anode active materials, and the anode material capable of inserting and extracting lithium is a base when lithium metal is precipitated.

The secondary battery is the same as a related-art lithium-ion secondary battery in terms of using the anode material capable of inserting and extracting lithium for the anode 22, and is the same as a related-art lithium metal secondary battery in terms of precipitating lithium metal on the anode 22; however, in the secondary battery, lithium metal is precipitated on the anode material capable of inserting and extracting lithium, so a high energy density can be obtained, and cycle characteristics and fast charge characteristics can be improved.

When the secondary battery is charged, lithium ions are extracted from the cathode 21, and are inserted into the anode material capable of inserting and extracting lithium included in the anode 22 through the electrolytic solution. When the secondary battery is further charged, lithium metal starts to be precipitated on the surface of the anode material capable of inserting and extracting lithium in a state in which the open circuit voltage is lower than the overcharge voltage. After that, until the charge is completed, the precipitation of lithium metal on the anode 22 continues. Next, when the secondary battery is discharged, the lithium metal precipitated on the anode 22 is eluted as ions, and the lithium ions are inserted into the cathode 21 through the electrolytic solution. When the secondary battery is further discharged, lithium ions are extracted from the anode material capable of inserting and extracting lithium in the anode 22, and are inserted into the cathode 21 through the electrolytic solution. Thus, in the secondary battery, the precipitation and dissolution of lithium metal are repeated in the anode 22, so the activity of the anode 22 becomes very high; however, the electrolytic solution includes 4,5-difluoro-1,3-dioxolane-2-one, so the decomposition reaction of the electrolytic solution can be prevented at not only room temperature but also high temperature.

(Fourth Secondary Battery)

Figure 3:
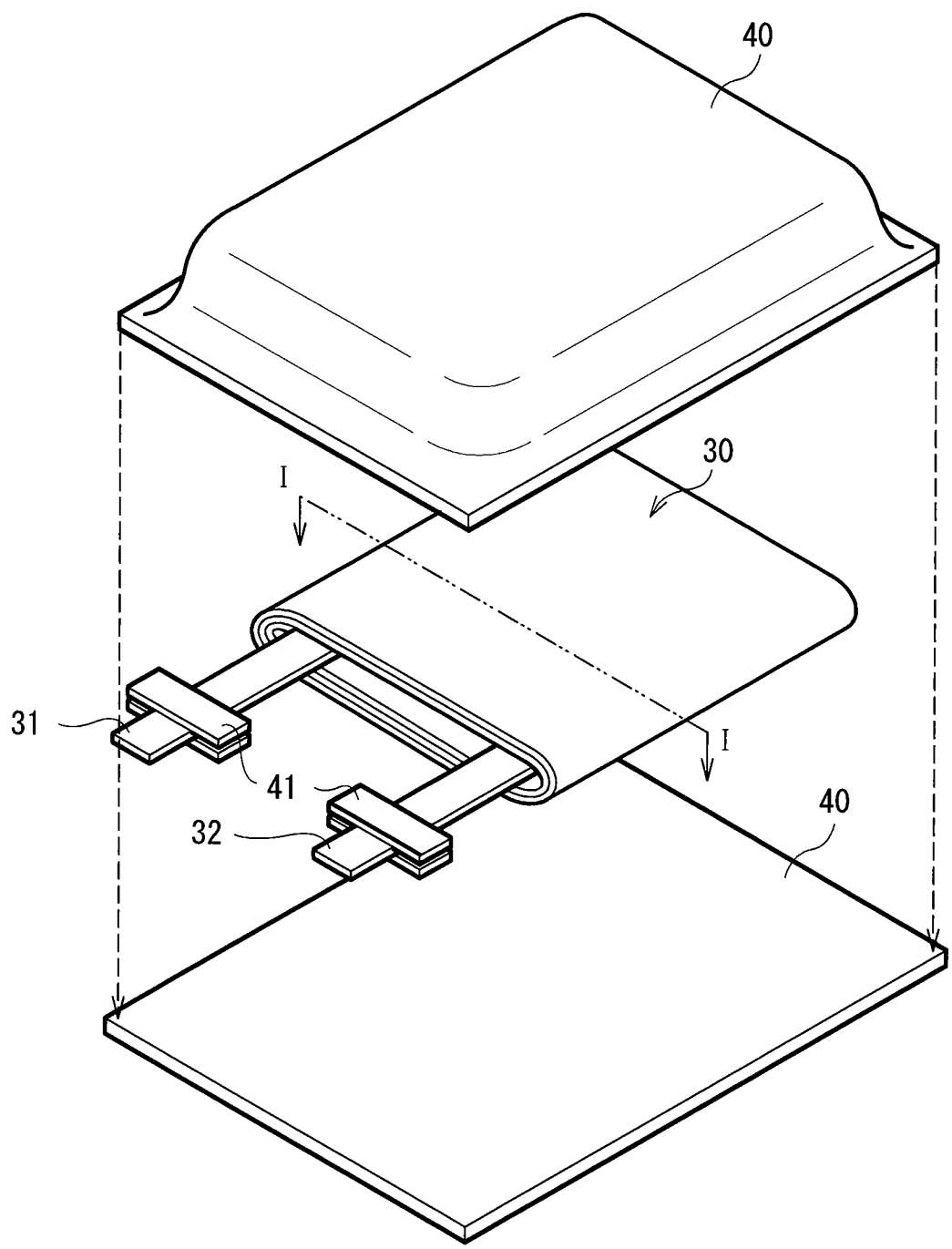
FIG. 3 is an exploded perspective view of the structure of a fourth secondary battery using the electrolytic solution according to the embodiment of the invention.

FIG. 3 shows the structure of a fourth secondary battery. The secondary battery is a so-called laminate film type, and in the secondary battery, a spirally wound electrode body 30 to which a cathode lead 31 and an anode lead 32 are attached is contained in film-shaped package members 40.

The cathode lead 31 and the anode lead 32 are drawn from the interiors of the package members 40 to outside, for example, in the same direction. The cathode lead 31 and the anode lead 32 are made of, for example, a metal material such as aluminum, copper, nickel or stainless in a sheet shape or a mesh shape.

The package members 40 are made of, for example, a rectangular aluminum laminate film including a nylon film, aluminum foil and a polyethylene film which are bonded in this order. The package members 40 are disposed so that the polyethylene film of each of the package members 40 faces the spirally wound electrode body 30, and edge portions of the package members 40 are adhered to each other by fusion bonding or an adhesive. An adhesive film 41 is inserted between the package members 40 and the cathode lead 31 and the anode lead 32 for preventing the entry of outside air. The adhesive film 41 is made of, for example, a material having adhesion to the cathode lead 31 and the anode lead 32, for example, a polyolefin resin such as polyethylene, polypropylene, modified polyethylene or modified polypropylene.

In addition, the package members 40 may be made of a laminate film with any other structure, a polymer film such as polypropylene or a metal film instead of the above-described aluminum laminate film.

Figure 4:
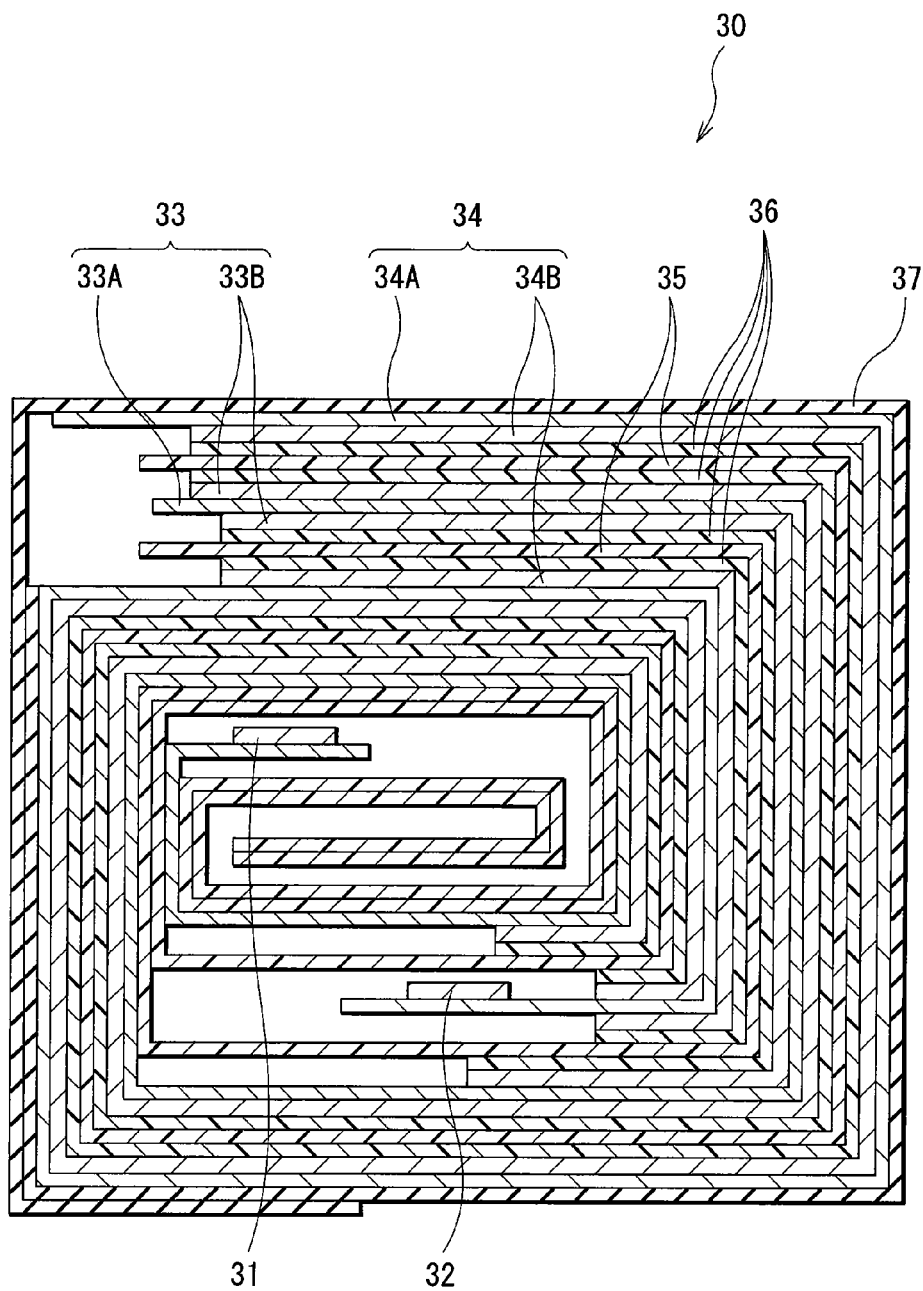
FIG. 4 is a sectional view of the spirally wound electrode body taken along a line I-I of FIG. 3.

FIG. 4 shows a sectional view of the spirally wound electrode body 30 taken along a line I-I of FIG. 3. The spirally wound electrode body 30 is a spirally wound laminate including a cathode 33 and an anode 34 with a separator 35 and an electrolyte layer 36 in between, and an outermost portion of the spirally wound electrode body 30 is protected with a protective tape 37.

The cathode 33 has a structure in which a cathode active material layer 33B is arranged on one side or both sides of a cathode current collector 33A. The anode 34 has a structure in which an anode active material layer 34B is arranged on one side or both sides of an anode current collector 34A, and the anode 34 is disposed so that the anode active material layer 34B faces the cathode active material layer 33B. The structures of the cathode current collector 33A, the cathode active material layer 33B, the anode current collector 34A, the anode active material layer 34B and the separator 35 are the same as those of the cathode current collector 21A, the cathode active material layer 21B, the anode current collector 22A, the anode active material layer 22B and the separator 23 in the above-described first, second and third secondary batteries, respectively.

The electrolyte layer 36 includes the electrolytic solution according to the embodiment and a polymer compound as a holding body which holds the electrolytic solution, and is a so-called gel electrolyte. The gel electrolyte is preferable, because high ionic conductivity can be obtained, and liquid leakage from the battery can be prevented. As the polymer material, for example, an ether-based polymer compound such as polyethylene oxide or a cross-link including polyethylene oxide, an ester-based polymer compound such as polymethacrylate or an acrylate-based polymer compound, or a polymer of vinylidene fluoride such as a copolymer of polyvinylidene fluoride or vinylidene fluoride and hexafluoropropylene, and one kind or a mixture including two or more kinds selected from them is used. More specifically, in terms of stability of oxidation-reduction, the fluororine-based polymer compound such as a polymer of vinylidene fluoride is preferable.

The secondary battery can be manufactured by the following steps, for example.

At first, the electrolyte layer 36 is formed by coating the cathode 33 and the anode 34 with a precursor solution including the electrolytic solution, the polymer compound and a mixed solvent, and volatilizing the mixed solvent. After that, the cathode lead 31 is attached to an end portion of the cathode current collector 33A by welding, and the anode lead 32 is attached to an end portion of the anode current collector 34A by welding. Next, after the cathode 33 on which the electrolyte layer 36 is formed and the anode 34 on which the electrolyte layer 36 is formed is laminated with the separator 35 in between to form a laminate, the laminate is spirally wound in a longitudinal direction, and the protective tape 37 is bonded to an outermost portion of the laminate so as to form the spirally wound electrode body 30. Finally, for example, the spirally wound electrode body 30 is sandwiched between the package members 40, and edge portions of the package members 40 are adhered to each other by thermal fusion bonding or the like to seal the spirally wound electrode body 30 in the package members 40. At this time, the adhesive film 41 is inserted between the cathode lead 31, the anode lead 32 and the package members 40. Thereby, the secondary battery shown in FIGS. 3 and 4 is completed.

Moreover, the secondary battery may be manufactured by the following steps. At first, after the cathode 33 and the anode 34 are formed as described above, and the cathode lead 31 and the anode lead 32 are attached to the cathode 33 and the anode 34, respectively, the cathode 33 and the anode 34 are laminated with the separator 35 in between to form a laminate, and the laminate is spirally wound, and the protective tape 37 is bonded to an outermost portion of the spirally wound laminate so as to form a spirally wound body as a precursor body of the spirally wound electrode body 30. Next, the spirally wound body is sandwiched between the package members 40, and the edge portions of the package members 40 except for one side are adhered by thermal fusion bonding to form a pouched package, thereby the spirally wound body is contained in the package members 40. Electrolytic components which includes the electrolytic solution, monomers as materials of a polymer compound and a polymerization initiator and, if necessary, any other material such as a polymerization inhibitor are prepared and injected in the package members 40.

After the electrolytic components are injected, an opened portion of the package members 40 are sealed by thermal fusion bonding in a vacuum atmosphere. Next, the monomers are polymerized by applying heat to form the polymer compound, thereby the gel electrolyte layer 36 is formed, and the secondary battery shown in FIGS. 3 and 4 is assembled.

The functions and effects of the secondary battery are the same as those of the above-described first, second and third secondary batteries.

Thus, in the embodiment, the electrolytic solution includes 4,5-difluoro-1,3-dioxolane-2-one, so also in the second, third and fourth secondary batteries, as in the case of the first secondary battery, the decomposition reaction of the electrolytic solution can be prevented at room temperature and high temperature, and the cycle characteristics can be improved, and high temperature storage characteristics and high temperature use characteristics can be improved.

EXAMPLES

Specific examples of the invention will be described in detail referring to the drawings.

Examples 1-1 to 1-24

Figure 5:
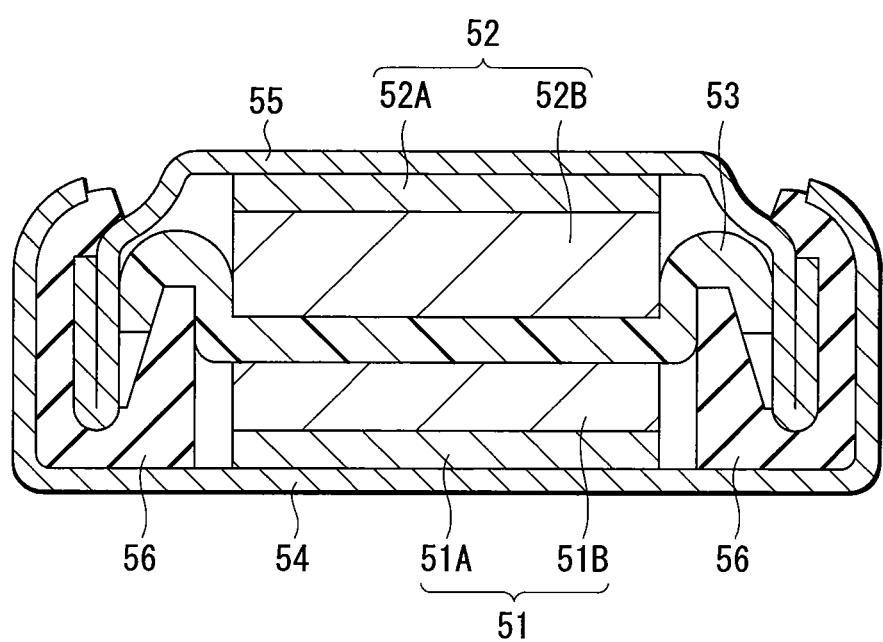
FIG. 5 is a sectional view of the structure of a secondary battery formed in an example of the invention.

Lithium-ion secondary batteries in which the capacity of an anode was represented by a capacity component by insertion and extraction of lithium were formed. The shape of each of the secondary batteries was a coin type shown in FIG. 5. In the secondary batteries, a cathode 51 and an anode 52 were laminated with a separator 53 in between, and they were sealed between a package can 54 and a package cup 55.

At first, lithium carbonate ($Li_2CO_3$) and cobalt carbonate ($CoCO_3$) were mixed at a ratio of $Li_2CO_3:CoCO_3=0.5:1$ (molar ratio), and were fired in air at 900° C. for 5 hours to obtain lithium-cobalt complex oxide ($LiCoO_2$) as a cathode active material. Next, after 91 parts by weight of the lithium-cobalt complex oxide, 6 parts by weight of graphite as an electrical conductor and 3 parts by weight of polyvinylidene fluoride as a binder were mixed to form a cathode mixture, the cathode mixture was dispersed in N-methyl-2-pyrrolidone as a solvent to form cathode mixture slurry. Next, after the cathode mixture slurry was applied to a cathode current collector 51A made of aluminum foil with a thickness of 20 µm, and was dried, the cathode mixture slurry was compression molded to form a cathode active material layer 51B. After that, the cathode current collector 51A was stamped into a pellet with a diameter of 15.5 mm to form the cathode 51.

Moreover, copper-tin alloy powder was prepared as an anode active material, and after 90 parts by weight of the copper-tin alloy powder and 10 parts by weight of polyvinylidene fluoride as a binder were mixed to form an anode mixture, the anode mixture was dispersed in N-methyl-2-pyrrolidone as a solvent to form anode mixture slurry. Next, after the anode mixture slurry was applied to an anode current collector 52A made of copper foil with a thickness of 10 µm, and was dried, the anode mixture slurry was compression molded to form an anode active material layer 52B. After that, the anode current collector 52A was stamped into a pellet with a diameter of 16 mm to form the anode 52. At that time, the amounts of the lithium-cobalt complex oxide and the copper-tin alloy powder were adjusted so that the charge capacity by the copper-tin alloy powder became larger than the charge capacity of the cathode 51, thereby the precipitation of lithium metal on the anode 52 during charge was prevented.

Next, after the formed cathode 51 and the formed anode 52 were put on the package can 54 with the separator 53 made of a microporous polypropylene film in between, and an electrolytic solution was injected from the top, and the cathode 51 and the anode 52 were sealed by putting the package cup 55 thereon and caulking. As the electrolytic solution, an electrolytic solution formed by dissolving $LiPF_6$ as an electrolyte salt at a concentration of 1 mol/l in a solvent with a composition changed as shown in Table 1 in each of Examples 1-1 through 1-24 was used.

More specifically, as the solvent, 4-fluoro-1,3-dioxolane-2-one (FEC), ethylene carbonate (EC), dimethyl carbonate (DMC), diethyl carbonate (DEC) and 4,5-difluoro-1,3-dioxolane-2-one (DFEC) were prepared, and the contents of them were changed. The composition of the solvent is expressed in volume as a unit.

At that time, 4-fluoro-1,3-dioxolane-2-one was obtained by synthesizing according to a method described in Journal of Fluorine Chemistry, 120 (2003) 105, and then refining. When the refined material was analyzed by gas chromatography, it was confirmed that the amount of a difluoride as an impurity was at the detection limit or less.

Moreover, 4,5-difluoro-1,3-dioxolane-2-one was obtained by synthesizing according to a method described in Journal of Fluorine Chemistry, 120 (2003) 105, and then refining. A cis-isomer and a trans-isomer of 4,5-difluoro-1,3-dioxolane-2-one were prepared.

Moreover, as Comparative Examples 1-1 through 1-5 relative to Examples 1-1 through 1-24, secondary batteries were formed as in the case of Examples 1-1 through 1-24, except that 4,5-difluoro-1,3-dioxolane-2-one was not added. Regarding the composition of the solvent except for 4,5-difluoro-1,3-dioxolane-2-one, Comparative Example 1-1 corresponds to Examples 1-1 through 1-3, Comparative Example 1-2 corresponds to Examples 1-4 through 1-14, Comparative Example 1-3 corresponds to Examples 1-15 through 1-20, Comparative Example 1-4 corresponds to Examples 1-21 through 1-23, and Comparative Example 1-5 corresponds to Example 1-24.

Charge-discharge tests were performed on the formed secondary batteries of Examples 1-1 through 1-24 and Comparative Examples 1-1 through 1-5 to determine the high temperature storage characteristics and the high temperature cycle characteristics of the secondary batteries. After two cycles of charge and discharge of the secondary batteries were repeated at 23° C., the batteries were charged again, and were left in a constant-temperature bath of 80° C. for 10 days, and then the secondary batteries were discharged again at 23° C., and the high temperature storage characteristics of the secondary batteries were determined as the ratio of a discharge capacity after storage to a discharge capacity before storage, that is, (discharge capacity after storage/discharge capacity before storage)×100. The discharge capacity before storage was a discharge capacity in the second cycle, and the discharge capacity after storage was a discharge capacity just after storage, that is, a discharge capacity in the third cycle.

Moreover, after two cycles of charge and discharge of the secondary batteries were repeated at 23° C., 100 cycles of charge and discharge of the secondary batteries were repeated in a constant-temperature bath of 60° C., and the high temperature cycle characteristics of the secondary batteries were determined as the ratio of a discharge capacity in the 100th cycle at high temperature to a discharge capacity in the second cycle at 23° C., that is, (discharge capacity in the 100th cycle at high temperature/discharge capacity in the second cycle at 23° C.)×100. The obtained results are shown in Table 1.

Charge and discharge were conducted under the same conditions, and after the secondary batteries were charged at a constant current density of 1 $mA/cm^2$ until a battery voltage reached 4.2 V, the secondary batteries were charged at a constant voltage of 4.2 V until a current density reached 0.02 $mA/cm^2$, and the secondary batteries were discharged at a constant current density of 1 $mA/cm^2$ until a battery voltage reached 2.5 V.

TABLE 1

Anode active material; Cu—Sn alloy, Method of forming anode active material layer; coating

| | COMPOSITION OF SOLVENT | | | | | | | CAPACITY RETENTION RATIO (%) | |
|---|---|---|---|---|---|---|---|---|---|
| | | | | | | DFEC (vol ppm) | | AFTER HIGH | HIGH |
| | FEC (vol %) | EC (vol %) | DMC (vol %) | DEC (vol %) | TOTAL | CIS-ISOMER | TRANS-ISOMER | TEMPERATURE STORAGE | TEMPERATURE CYCLE |
| EXAMPLE 1-1 | 2 | 48 | 50 | 0 | 5 | 5 | 0 | 65 | 61 |
| EXAMPLE 1-2 | 2 | 48 | 50 | 0 | | 0 | 5 | 66 | 62 |
| EXAMPLE 1-3 | 2 | 48 | 50 | 0 | | 2.5 | 2.5 | 66 | 65 |
| EXAMPLE 1-4 | 10 | 40 | 50 | 0 | 5 | 5 | 0 | 65 | 64 |
| EXAMPLE 1-5 | 10 | 40 | 50 | 0 | | 0 | 5 | 65 | 63 |
| EXAMPLE 1-6 | 10 | 40 | 50 | 0 | | 2.5 | 2.5 | 66 | 68 |
| EXAMPLE 1-7 | 10 | 40 | 50 | 0 | 15 | 15 | 0 | 67 | 67 |
| EXAMPLE 1-8 | 10 | 40 | 50 | 0 | | 0 | 15 | 67 | 68 |
| EXAMPLE 1-9 | 10 | 40 | 50 | 0 | | 7.5 | 7.5 | 68 | 69 |
| EXAMPLE 1-10 | 10 | 40 | 50 | 0 | 50 | 50 | 0 | 67 | 66 |
| EXAMPLE 1-11 | 10 | 40 | 50 | 0 | | 0 | 50 | 68 | 66 |
| EXAMPLE 1-12 | 10 | 40 | 50 | 0 | | 25 | 25 | 68 | 68 |
| EXAMPLE 1-13 | 10 | 40 | 50 | 0 | 200 | 200 | 0 | 67 | 65 |
| EXAMPLE 1-14 | 10 | 40 | 50 | 0 | | 50 | 150 | 69 | 69 |
| EXAMPLE 1-15 | 30 | 20 | 50 | 0 | 50 | 50 | 0 | 67 | 64 |
| EXAMPLE 1-16 | 30 | 20 | 50 | 0 | | 25 | 25 | 67 | 68 |
| EXAMPLE 1-17 | 30 | 20 | 50 | 0 | | 10 | 40 | 68 | 69 |
| EXAMPLE 1-18 | 30 | 20 | 50 | 0 | 500 | 500 | 0 | 64 | 65 |
| EXAMPLE 1-19 | 30 | 20 | 50 | 0 | | 0 | 500 | 65 | 64 |
| EXAMPLE 1-20 | 30 | 20 | 50 | 0 | | 250 | 250 | 65 | 68 |
| EXAMPLE 1-21 | 50 | 0 | 0 | 50 | 15 | 15 | 0 | 67 | 68 |
| EXAMPLE 1-22 | 50 | 0 | 0 | 50 | 500 | 200 | 300 | 64 | 67 |
| EXAMPLE 1-23 | 50 | 0 | 0 | 50 | 2000 | 2000 | 0 | 66 | 66 |

TABLE 1-continued

Anode active material; Cu—Sn alloy, Method of forming anode active material layer; coating

| | COMPOSITION OF SOLVENT | | | | | | CAPACITY RETENTION RATIO (%) | |
|---|---|---|---|---|---|---|---|---|
| | | | | | DFEC (vol ppm) | | AFTER HIGH | HIGH |
| | FEC (vol %) | EC (vol %) | DMC (vol %) | DEC (vol %) | TOTAL | CIS-ISOMER | TRANS-ISOMER | TEMPERATURE STORAGE | TEMPERATURE CYCLE |
| EXAMPLE 1-24 | 100 | 0 | 0 | 0 | 150 | 50 | 100 | 66 | 66 |
| COMPARATIVE EXAMPLE 1-1 | 2 | 48 | 50 | 0 | 0 | 0 | 0 | 58 | 58 |
| COMPARATIVE EXAMPLE 1-2 | 10 | 40 | 50 | 0 | 0 | 0 | 0 | 57 | 60 |
| COMPARATIVE EXAMPLE 1-3 | 30 | 20 | 50 | 0 | 0 | 0 | 0 | 58 | 59 |
| COMPARATIVE EXAMPLE 1-4 | 50 | 0 | 0 | 50 | 0 | 0 | 0 | 58 | 54 |
| COMPARATIVE EXAMPLE 1-5 | 100 | 0 | 0 | 0 | 0 | 0 | 0 | 50 | 50 |

FEC; 4-fluoro-1,3-dioxolane-2-one, EC; ethylene carbonate, DMC; dimethyl carbonate, DEC; diethyl carbonate, DFEC; 4,5-difluoro-1,3-dioxolane-2-one As shown in Table 1, in Examples 1-1 through 1-24 in which 4,5-difluoro-1,3-dioxolane-2-one was added, compared to Comparative Examples 1-1 through 1-5 in which 4,5-difluoro-1,3-dioxolane-2-one was not added, the high temperature storage characteristics and the high temperature cycle characteristics could be improved. In other words, it was found out that in the case where a material including tin as an element was used as the anode active material, when the electrolytic solution included 4,5-difluoro-1,3-dioxolane-2-one, high temperature characteristics could be improved.

Moreover, when the content of 4,5-difluoro-1,3-dioxolane-2-one was within a range from 5 vol ppm to 2000 vol ppm, effects was shown. In other words, it was found out that when a mixture of 4,5-difluoro-1,3-dioxolane-2-one and 4-fluoro-1,3-dioxolane-2-one was used, the content of 4,5-difluoro-1,3-dioxolane-2-one was preferably within a range from 5 vol ppm to 2000 vol ppm inclusive, and more preferably within a range from 5 vol ppm to 500 vol ppm inclusive.

Further, Examples 1-3, 1-6, 1-9, 1-12, 1-14, 1-17 and 1-20 in which both a cis-isomer and a trans-isomer of 4,5-difluoro-1,3-dioxolane-2-one were added could obtain a higher capacity retention ratio than examples in which only either of them was added. In other words, it was found out that both cis-4,5-difluoro-1,3-dioxolane-2-one and trans-4,5-difluoro-1,3-dioxolane-2-one were preferably included.

Examples 2-1 to 2-23

Secondary batteries were formed as in the case of Examples 1-1 through 1-24, except that silicon was used as the anode active material, and the anode active material layer 52B was formed by an electron beam evaporation method. At that time, the composition of the solvent in the electrolytic solution was changed as shown in Table 2 in Examples 2-1 through 2-23.

Moreover, as Comparative Examples 2-1 through 2-4 relative to Examples 2-1 through 2-23, secondary batteries were formed as in the case of 2-1 through 2-23, except that 4,5-difluoro-1,3-dioxolane-2-one was not added. Regarding the composition of the solvent except for 4,5-difluoro-1,3-dioxolane-2-one, Comparative Example 2-1 corresponds to Examples 2-1 through 2-3, Comparative Example 2-2 corresponds to Examples 2-4 through 2-14, Comparative Example 2-3 corresponds to Examples 2-15 through 2-20, and Comparative Example 2-4 corresponds to Examples 2-21 through 2-23.

Charge-discharge tests were performed on the secondary batteries of Examples 2-1 through 2-23 and Comparative Examples 2-1 through 2-4 as in the case of Examples 1-1 through 1-24 to determine the high temperature storage characteristics and the high temperature cycle characteristics of the secondary batteries. The results are shown in Table 2.

TABLE 2

Anode active material; Si, Method of forming anode active material layer; electron beam

| | COMPOSITION OF SOLVENT | | | | | | | CAPACITY RETENTION RATIO (%) | |
|---|---|---|---|---|---|---|---|---|---|
| | | | | | DFEC (vol ppm) | | | AFTER HIGH | HIGH |
| | FEC (vol %) | EC (vol %) | DMC (vol %) | DEC (vol %) | TOTAL | CIS-ISOMER | TRANS-ISOMER | TEMPERATURE STORAGE | TEMPERATURE CYCLE |
| EXAMPLE 2-1 | 2 | 48 | 50 | 0 | 5 | 5 | 0 | 64 | 64 |
| EXAMPLE 2-2 | 2 | 48 | 50 | 0 | | 0 | 5 | 65 | 64 |
| EXAMPLE 2-3 | 2 | 48 | 50 | 0 | | 2.5 | 2.5 | 65 | 66 |
| EXAMPLE 2-4 | 10 | 40 | 50 | 0 | 5 | 5 | 0 | 64 | 65 |
| EXAMPLE 2-5 | 10 | 40 | 50 | 0 | | 0 | 5 | 65 | 66 |
| EXAMPLE 2-6 | 10 | 40 | 50 | 0 | | 2.5 | 2.5 | 66 | 69 |
| EXAMPLE 2-7 | 10 | 40 | 50 | 0 | 15 | 15 | 0 | 66 | 69 |
| EXAMPLE 2-8 | 10 | 40 | 50 | 0 | | 0 | 15 | 65 | 69 |
| EXAMPLE 2-9 | 10 | 40 | 50 | 0 | | 7.5 | 7.5 | 64 | 70 |
| EXAMPLE 2-10 | 10 | 40 | 50 | 0 | 50 | 50 | 0 | 64 | 67 |

TABLE 2-continued

Anode active material; Si, Method of forming anode active material layer; electron beam

| | COMPOSITION OF SOLVENT | | | | | | CAPACITY RETENTION RATIO (%) | |
|---|---|---|---|---|---|---|---|---|
| | | | | | DFEC (vol ppm) | | AFTER HIGH | HIGH |
| | FEC (vol %) | EC (vol %) | DMC (vol %) | DEC (vol %) | TOTAL | CIS-ISOMER | TRANS-ISOMER | TEMPERATURE STORAGE | TEMPERATURE CYCLE |
| EXAMPLE 2-11 | 10 | 40 | 50 | 0 | | 0 | 50 | 65 | 66 |
| EXAMPLE 2-12 | 10 | 40 | 50 | 0 | | 25 | 25 | 67 | 72 |
| EXAMPLE 2-13 | 10 | 40 | 50 | 0 | 200 | 200 | 0 | 64 | 68 |
| EXAMPLE 2-14 | 10 | 40 | 50 | 0 | | 50 | 150 | 65 | 71 |
| EXAMPLE 2-15 | 30 | 20 | 50 | 0 | 50 | 50 | 0 | 65 | 73 |
| EXAMPLE 2-16 | 30 | 20 | 50 | 0 | | 25 | 25 | 66 | 78 |
| EXAMPLE 2-17 | 30 | 20 | 50 | 0 | | 10 | 40 | 65 | 78 |
| EXAMPLE 2-18 | 30 | 20 | 50 | 0 | 500 | 500 | 0 | 62 | 73 |
| EXAMPLE 2-19 | 30 | 20 | 50 | 0 | | 0 | 500 | 62 | 73 |
| EXAMPLE 2-20 | 30 | 20 | 50 | 0 | | 250 | 250 | 63 | 77 |
| EXAMPLE 2-21 | 50 | 0 | 0 | 50 | 15 | 15 | 0 | 65 | 68 |
| EXAMPLE 2-22 | 50 | 0 | 0 | 50 | 500 | 200 | 300 | 65 | 77 |
| EXAMPLE 2-23 | 50 | 0 | 0 | 50 | 2000 | 2000 | 0 | 66 | 77 |
| COMPARATIVE EXAMPLE 2-1 | 2 | 48 | 50 | 0 | 0 | 0 | 0 | 55 | 58 |
| COMPARATIVE EXAMPLE 2-2 | 10 | 40 | 50 | 0 | 0 | 0 | 0 | 56 | 62 |
| COMPARATIVE EXAMPLE 2-3 | 30 | 20 | 50 | 0 | 0 | 0 | 0 | 56 | 70 |
| COMPARATIVE EXAMPLE 2-4 | 50 | 0 | 0 | 50 | 0 | 0 | 0 | 55 | 60 |

FEC; 4-fluoro-1,3-dioxolane-2-one, EC; ethylene carbonate, DMC; dimethyl carbonate, DEC; diethyl carbonate, DFEC; 4,5-difluoro-1,3-dioxolane-2-one As shown in Table 2, in Examples 2-1 through 2-23, as in the case of Examples 1-1 through 1-24, compared to Comparative Examples 2-1 through 2-4, the high temperature storage characteristics and the high temperature cycle characteristics could be improved. Moreover, when the content of 4,5-difluoro-1,3-dioxolane-2-one was within a range from 5 vol ppm to 2000 vol ppm, effects were shown, and a more preferable content was within a range from 5 vol ppm to 500 vol ppm inclusive. Further, when both the cis-isomer and the trans-isomer of 4,5-difluoro-1,3-dioxolane-2-one were added, higher effects were obtained.

In other words, it was found out that even in the case where a material including silicon as an element was used as the anode active material, when the electrolytic solution included 4,5-difluoro-1,3-dioxolane-2-one, high temperature characteristics could be improved.

Examples 3-1, 4-1

Secondary batteries were formed as in the case of Example 1-15 and 2-15, except that the method of forming 4,5-difluoro-1,3-dioxolane-2-one was changed. In other words, 4,5-difluoro-1,3-dioxolane-2-one was obtained by synthesizing according to a method described in Tetrahedron Letters, 43 (2002)1503, and then refining. When the refined material was analyzed by gas chromatography, it was confirmed that the amount of a difluoride as an impurity was at the detection limit or less Charge-discharge tests were performed on the secondary batteries of Examples 3-1 and 4-1 as in the case of Examples 1-15 and 2-15 to determine the high temperature storage characteristics and the high temperature cycle characteristics of the secondary batteries. The results are shown in Tables 3 and 4.

TABLE 3

Anode active material; Cu—Sn alloy, Method of forming anode active material layer; coating

| | COMPOSITION OF SOLVENT | | | | | | | CAPACITY RETENTION RATIO (%) | |
|---|---|---|---|---|---|---|---|---|---|
| | | | | | DFEC (vol ppm) | | | AFTER HIGH | HIGH |
| | FEC (vol %) | EC (vol %) | DMC (vol %) | DEC (vol %) | TOTAL | CIS-ISOMER | TRANS-ISOMER | TEMPERATURE STORAGE | TEMPERATURE CYCLE |
| EXAMPLE 3-1 | 30 | 20 | 50 | 0 | 50 | 50 | 0 | 69 | 65 |
| EXAMPLE 1-15 | 30 | 20 | 50 | 0 | 50 | 50 | 0 | 67 | 64 |

FEC; 4-fluoro-1,3-dioxolane-2-one, EC; ethylene carbonate, DMC; dimethyl carbonate, DEC; diethyl carbonate, DFEC; 4,5-difluoro-1,3-dioxolane-2-one

* The method of synthesizing FEC is different between Examples 3-1 and 1-15.

TABLE 4

Anode active material; Si, Method of forming anode active material layer; electron beam

| | COMPOSITION OF SOLVENT | | | | | | CAPACITY RETENTION RATIO (%) | |
|---|---|---|---|---|---|---|---|---|
| | | | | | DFEC (vol ppm) | | AFTER HIGH | HIGH |
| | FEC (vol %) | EC (vol %) | DMC (vol %) | DEC (vol %) | TOTAL | CIS-ISOMER | TRANS-ISOMER | TEMPERATURE STORAGE | TEMPERATURE CYCLE |
| EXAMPLE 4-1 | 30 | 20 | 50 | 0 | 50 | 50 | 0 | 65 | 72 |
| EXAMPLE 2-15 | 30 | 20 | 50 | 0 | 50 | 50 | 0 | 65 | 73 |

FEC; 4-fluoro-1,3-dioxolane-2-one, EC; ethylene carbonate, DMC; dimethyl carbonate, DEC; diethyl carbonate, DFEC; 4,5-difluoro-1,3-dioxolane-2-one
* The method of synthesizing FEC is different between Examples 4-1 and 2-15.

As shown in Tables 3 and 4, in Examples 3-1 and 4-1, results equivalent to those in Examples 1-15 and 2-15 were obtained. In other words, it was found out that irrespective of the method of synthesizing 4,5-difluoro-1,3-dioxolane-2-one, when the electrolytic solution included 4,5-difluoro-1,3-dioxolane-2-one, high temperature characteristics could be improved.

Examples 5-1 to 5-3, 6-1 to 6-3, 7-1 to 7-3

Secondary batteries were formed as in the case of Examples 1-4 through 1-6, except that silicon was used as the anode active material, and the method of forming the anode 52 was changed. In other words, the same anode active material as that used in Examples 2-4 through 2-6 was used, and the anode 52 was formed by another method.

At that time, in Examples 5-1 through 5-3, after the anode active material layer 52B was formed by depositing silicon on the anode current collector 52A made of electrolytic copper foil with an arithmetic mean roughness Ra of 0.5 μm and a thickness of 35 μm by a vacuum evaporation method, the anode active material layer 52B was dried by heating in a vacuum to form the anode 52. Moreover, in Examples 6-1 through 6-3, the anode active material layer 52B was formed by depositing silicon on the same anode current collector 52A by a sputtering method to form the anode 52. Further, in Examples 7-1 through 7-3, 90 wt % of silicon powder with an average particle diameter of 1 μm and 10 wt % of polyvinylidene fluoride as a binder were dispersed in N-methyl-2-pyrrolidone as a dispersion medium to form a mixture, and after the mixture was applied to the anode current collector 52A made of electrolytic copper foil with a thickness of 18 μm, and was dried and compressed, the mixture was heated at 400° C. for 12 hours in a vacuum atmosphere to form the anode active material layer 52B, thereby the anode 52 was formed.

Moreover, as Comparative Examples 5-1, 6-1 and 7-1 relative to Examples, 5-1 through 5-3, 6-1 through 6-3 and 7-1 through 7-3, secondary batteries were formed as in the case of Examples 5-1 through 5-3, 6-1 through 6-3 and 7-1 through 7-3, except that 4,5-difluoro-1,3-dioxolane-2-one was not added.

Charge-discharge tests were performed on the secondary batteries of Examples 5-1 through 5-3, 6-1 through 6-3 and 7-1 through 7-3 and Comparative Examples 5-1, 6-1 and 7-1 as in the case of Examples 1-4 through 1-6 and 2-4 through 2-6 to determine the high temperature storage characteristics and the high temperature cycle characteristics of the secondary batteries. The results are shown in Tables 5 through 7.

TABLE 5

Anode active material; Si, Method of forming anode active material layer; evaporation

| | COMPOSITION OF SOLVENT | | | | | | | CAPACITY RETENTION RATIO (%) | |
|---|---|---|---|---|---|---|---|---|---|
| | | | | | | DFEC (vol ppm) | | AFTER HIGH | HIGH |
| | FEC (vol %) | EC (vol %) | DMC (vol %) | DEC (vol %) | TOTAL | CIS-ISOMER | TRANS-ISOMER | TEMPERATURE STORAGE | TEMPERATURE CYCLE |
| EXAMPLE 5-1 | 10 | 40 | 50 | 0 | 5 | 5 | 0 | 65 | 65 |
| EXAMPLE 5-2 | 10 | 40 | 50 | 0 | 5 | 0 | 5 | 64 | 65 |
| EXAMPLE 5-3 | 10 | 40 | 50 | 0 | 5 | 2.5 | 2.5 | 65 | 68 |
| COMPARATIVE EXAMPLE 5-1 | 10 | 40 | 50 | 0 | 0 | 0 | 0 | 57 | 62 |

FEC; 4-fluoro-1,3-dioxolane-2-one, EC; ethylene carbonate, DMC; dimethyl carbonate, DEC; diethyl carbonate, DFEC; 4,5-difluoro-1,3-dioxolane-2-one

TABLE 6

Anode active material: Si, Method of forming anode active material layer; sputtering

| | COMPOSITION OF SOLVENT | | | | | | CAPACITY RETENTION RATIO (%) | |
|---|---|---|---|---|---|---|---|---|
| | | | | | | DFEC (vol ppm) | AFTER HIGH | HIGH |
| | FEC (vol %) | EC (vol %) | DMC (vol %) | DEC (vol %) | TOTAL | CIS-ISOMER | TRANS-ISOMER | TEMPERATURE STORAGE | TEMPERATURE CYCLE |
| EXAMPLE 6-1 | 10 | 40 | 50 | 0 | 5 | 5 | 0 | 63 | 63 |
| EXAMPLE 6-2 | 10 | 40 | 50 | 0 | 5 | 0 | 5 | 62 | 61 |
| EXAMPLE 6-3 | 10 | 40 | 50 | 0 | 5 | 2.5 | 2.5 | 64 | 66 |
| COMPARATIVE EXAMPLE 6-1 | 10 | 40 | 50 | 0 | 0 | 0 | 0 | 55 | 57 |

FEC; 4-fluoro-1,3-dioxolane-2-one, EC; ethylene carbonate, DMC; dimethyl carbonate, DEC; diethyl carbonate, DFEC; 4,5-difluoro-1,3-dioxolane-2-one

TABLE 7

Anode active material: Si, Method of forming anode active material layer; firing

| | COMPOSITION OF SOLVENT | | | | | | | CAPACITY RETENTION RATIO (%) | |
|---|---|---|---|---|---|---|---|---|---|
| | | | | | | DFEC (vol ppm) | | AFTER HIGH | HIGH |
| | FEC (vol %) | EC (vol %) | DMC (vol %) | DEC (vol %) | TOTAL | CIS-ISOMER | TRANS-ISOMER | TEMPERATURE STORAGE | TEMPERATURE CYCLE |
| EXAMPLE 7-1 | 10 | 40 | 50 | 0 | 50 | 50 | 0 | 56 | 52 |
| EXAMPLE 7-2 | 10 | 40 | 50 | 0 | 50 | 0 | 50 | 56 | 51 |
| EXAMPLE 7-3 | 10 | 40 | 50 | 0 | 50 | 25 | 25 | 58 | 55 |
| COMPARATIVE EXAMPLE 7-1 | 10 | 40 | 50 | 0 | 0 | 0 | 0 | 48 | 46 |

FEC; 4-fluoro-1,3-dioxolane-2-one, EC; ethylene carbonate, DMC; dimethyl carbonate, DEC; diethyl carbonate, DFEC; 4,5-difluoro-1,3-dioxolane-2-one As shown in Tables 5 through 7, in Examples 5-1 through 5-3, 6-1 through 6-3 and 7-1 through 7-3, as in the case of Examples 1-4 through 1-6 and 2-4 through 2-6, compared to Comparative Examples 5-1, 6-1 and 7-1, the high temperature storage characteristics and the high temperature cycle characteristics could be improved. In other words, it was found out that even in the case where the anode active material layer was formed by another method, when the electrolytic solution included 4,5-difluoro-1,3-dioxolane-2-one, high temperature characteristics could be improved.

Examples 8-1 to 8-9

Secondary batteries were formed as in the case of Examples 1-1 through 1-24, except that the anode 52 was formed through the use of artificial graphite powder as the anode active material. As the solvent of the electrolytic solution, 4-fluoro-1,3-dioxolane-2-one, ethylene carbonate, dimethyl carbonate, ethyl methyl carbonate (EMC), vinylene carbonate (VC) and 4,5-difluoro-1,3-dioxolane-2-one were prepared, and the contents of them were changes as shown in Table 8. Moreover, as Comparative Examples 8-1 through 8-3 relative to Examples 8-1 through 8-9, secondary batteries were formed as in the case of Examples 8-1 through 8-9, except that 4,5-difluoro-1,3-dioxolane-2-one was not added, and the composition of the solvent was changed as shown in Table 8.

Charge-discharge tests were performed on the secondary batteries of Examples 8-1 through 8-9 and Comparative Examples 8-1 through 8-3 as in the case of Examples 1-1 through 1-24 to determine the high temperature storage characteristics and the high temperature cycle characteristics of the secondary batteries. The results are shown in Table 8.

TABLE 8

Anode active material: artificial graphite, Method of forming anode active material layer; coating

| | COMPOSITION OF SOLVENT | | | | | | | | CAPACITY RETENTION RATIO (%) | |
|---|---|---|---|---|---|---|---|---|---|---|
| | | | | | | | DFEC (vol ppm) | | AFTER HIGH | HIGH |
| | FEC (vol %) | EC (vol %) | DMC (vol %) | EMC (vol %) | VC (vol %) | TOTAL | CIS-ISOMER | TRANS-ISOMER | TEMPERATURE STORAGE | TEMPERATURE CYCLE |
| EXAMPLE 8-1 | 5 | 30 | 0 | 65 | 0 | 50 | 25 | 25 | 64 | 52 |
| EXAMPLE 8-2 | 10 | 40 | 50 | 0 | 0 | 5 | 5 | 0 | 67 | 53 |
| EXAMPLE 8-3 | 10 | 40 | 50 | 0 | 0 | 5 | 0 | 5 | 68 | 51 |
| EXAMPLE 8-4 | 10 | 40 | 50 | 0 | 0 | 5 | 2.5 | 2.5 | 69 | 56 |
| EXAMPLE 8-5 | 10 | 40 | 50 | 0 | 0 | 100 | 50 | 50 | 67 | 69 |
| EXAMPLE 8-6 | 10 | 40 | 50 | 0 | 0 | 500 | 250 | 250 | 67 | 69 |
| EXAMPLE 8-7 | 10 | 38 | 50 | 0 | 2 | 500 | 250 | 250 | 68 | 70 |
| EXAMPLE 8-8 | 15 | 35 | 30 | 20 | 0 | 500 | 250 | 250 | 68 | 69 |

TABLE 8-continued

Anode active material; artificial graphite, Method of forming anode active material layer; coating

| | COMPOSITION OF SOLVENT | | | | | | | CAPACITY RETENTION RATIO (%) | |
|---|---|---|---|---|---|---|---|---|---|
| | | | | | | DFEC (vol ppm) | | AFTER HIGH | HIGH |
| | FEC (vol %) | EC (vol %) | DMC (vol %) | EMC (vol %) | VC (vol %) | TOTAL | CIS-ISOMER | TRANS-ISOMER | TEMPERATURE STORAGE | TEMPERATURE CYCLE |
| EXAMPLE 8-9 | 10 | 40 | 50 | 0 | 0 | 2000 | 1000 | 1000 | 67 | 69 |
| COMPARATIVE EXAMPLE 8-1 | 10 | 40 | 50 | 0 | 0 | 0 | 0 | 0 | 59 | 49 |
| COMPARATIVE EXAMPLE 8-2 | 5 | 30 | 0 | 65 | 0 | 0 | 0 | 0 | 57 | 47 |
| COMPARATIVE EXAMPLE 8-3 | 15 | 35 | 0 | 50 | 0 | 0 | 0 | 0 | 59 | 49 |

FEC; 4-fluoro-1,3-dioxolane-2-one, EC; ethylene carbonate, DMC; dimethyl carbonate, EMC; ethyl methyl carbonate, VC; vinylene carbonate, DFEC; 4,5-difluoro-1,3-dioxolane-2-one As shown in Table 8, in Examples 8-1 through 8-9, as in the case of Examples 1-1 through 1-24, compared to Comparative Examples 8-1 through 8-3, the high temperature storage characteristics and the high temperature cycle characteristics could be improved. Moreover, when the content of 4,5-difluoro-1,3-dioxolane-2-one was within a range from 5 vol ppm to 2000 vol ppm, effects were shown. In other words, it was found out that even in the case where a carbon material was used as the anode active material, when the electrolytic solution included 4,5-difluoro-1,3-dioxolane-2-one, high temperature characteristics could be improved.

Examples 9-1 to 9-3

Lithium metal secondary batteries in which the capacity of an anode is represented by a capacity component by precipitation and dissolution of lithium were formed. The shape of each of the secondary batteries was a coin type shown in FIG. 5, and the secondary batteries were the same as those in Examples 1-15 through 1-17, except that a metal lithium plate with a thickness of 1 mm was stamped into a circular shape with a diameter of 16 mm to form the anode 52. Moreover, as Comparative Example 9-1 relative to Examples 9-1 through 9-3, a secondary battery was formed as in the case of Examples 9-1 through 9-3, except that 4,5-difluoro-1,3-dioxolane-2-one was not added.

Charge-discharge tests were performed on the secondary batteries of Examples 9-1 through 9-3 and Comparative Example 9-1 as in the case of Examples 1-15 and 1-17 to determine the high temperature storage characteristics and the high temperature cycle characteristics of the secondary batteries. The results are shown in Table 9.

As shown in Table 9, in Examples 9-1 through 9-3, as in the case of Examples 1-15 through 1-17, compared to Comparative Example 9-1, the high temperature storage characteristics and the high temperature cycle characteristics could be improved. In other words, it was found out that even in the lithium metal secondary batteries using lithium metal as the anode active material, when the electrolytic solution included 4,5-difluoro-1,3-dioxolane-2-one, high temperature characteristics could be improved.

Examples 10-1 to 10-3

Secondary batteries in which the capacity of an anode included a capacity component by insertion and extraction of lithium and a capacity component by precipitation and dissolution of lithium, and was represented by the sum of them were formed. The shape of each of the secondary batteries was a coin type shown in FIG. 5, and the secondary batteries were the same as those in Examples 1-15 through 1-17, except that the anode 52 was formed through the use of artificial graphite powder as the anode active material, and the amount of the artificial graphite powder was adjusted so that the charge capacity by the artificial graphite became smaller than the charge capacity of the cathode 51, and lithium metal was precipitated on the anode 52 during charge. As Comparative Example 10-1 relative to Examples 10-1 through 10-3, a secondary battery was formed as in the case of Examples 10-1 through 10-3, except that 4,5-difluoro-1,3-dioxolane-2-one was not added.

Charge-discharge tests were performed on the secondary batteries of Examples 10-1 through 10-3 and Comparative Example 10-1 as in the case of Examples 1-15 through 1-17 to determine the high temperature storage characteristics and

TABLE 9

Anode active material; Li metal

| | COMPOSITION OF SOLVENT | | | | | | | CAPACITY RETENTION RATIO (%) | |
|---|---|---|---|---|---|---|---|---|---|
| | | | | | | DFEC (vol ppm) | | AFTER HIGH | HIGH |
| | FEC (vol %) | EC (vol %) | DMC (vol %) | DEC (vol %) | TOTAL | CIS-ISOMER | TRANS-ISOMER | TEMPERATURE STORAGE | TEMPERATURE CYCLE |
| EXAMPLE 9-1 | 30 | 20 | 50 | 0 | 50 | 50 | 0 | 63 | 59 |
| EXAMPLE 9-2 | 30 | 20 | 50 | 0 | 50 | 25 | 25 | 63 | 63 |
| EXAMPLE 9-3 | 30 | 20 | 50 | 0 | 50 | 10 | 40 | 64 | 63 |
| COMPARATIVE EXAMPLE 9-1 | 30 | 20 | 50 | 0 | 0 | 0 | 0 | 56 | 56 |

FEC; 4-fluoro-1,3-dioxolane-2-one, EC; ethylene carbonate, DMC; dimethyl carbonate, DEC; diethyl carbonate, DFEC; 4,5-difluoro-1,3-dioxolane-2-one the high temperature cycle characteristics of the secondary batteries. The results are shown in Table 10.

lithium metal on the anode 22 during charge was prevented. In other words, as in the case of Examples 1-1 through 1-24,

TABLE 10

Anode active material; graphite + Li metal, Method of forming anode active material layer; coating

| | COMPOSITION OF SOLVENT | | | | | | CAPACITY RETENTION RATIO (%) | |
|---|---|---|---|---|---|---|---|---|
| | | | | | DFEC (vol ppm) | | AFTER HIGH | HIGH |
| | FEC (vol %) | EC (vol %) | DMC (vol %) | DEC (vol %) | TOTAL | CIS-ISOMER | TRANS-ISOMER | TEMPERATURE STORAGE | TEMPERATURE CYCLE |
| EXAMPLE 10-1 | 30 | 20 | 50 | 0 | 50 | 50 | 0 | 67 | 54 |
| EXAMPLE 10-2 | 30 | 20 | 50 | 0 | 50 | 25 | 25 | 67 | 57 |
| EXAMPLE 10-3 | 30 | 20 | 50 | 0 | 50 | 10 | 40 | 65 | 57 |
| COMPARATIVE EXAMPLE 10-1 | 30 | 20 | 50 | 0 | 0 | 0 | 0 | 61 | 51 |

FEC; 4-fluoro-1,3-dioxolane-2-one, EC; ethylene carbonate, DMC; dimethyl carbonate, DEC; diethyl carbonate, DFEC; 4,5-difluoro-1,3-dioxolane-2-one As shown in Table 10, in Examples 10-1 through 10-3, as in the case of Examples 1-15 through 1-17, compared to Comparative Example 10-1, the high temperature storage characteristics and the high temperature cycle characteristics could be improved. In other words, it was found out that even in the secondary battery in which the capacity of an anode included a capacity component by insertion and extraction of lithium and precipitation and dissolution of lithium, and was represented by the sum of them, when the electrolytic solution included 4,5-difluoro-1,3-dioxolane-2-one, high temperature characteristics could be improved.

Examples 11-1 to 11-5, 12-1 through 12-6, 13-1 through 13-6

Cylindrical type secondary batteries shown in FIGS. 1 and 2 were formed. The cathode 21 was formed as in the case of Examples 1-1 through 1-24. In Examples 11-1 through 11-5, the anode 22 was formed as in the case of Examples 1-1 through 1-24, and in Examples 12-1 through 12-6, the anode 22 was formed as in the case of Examples 2-1 through 2-23, and in Examples 13-1 through 13-6, the anode 22 was formed as in the case of Examples 7-1 through 7-3. In other words, in Examples 11-1 through 11-5, a copper-tin alloy powder was used as the anode active material, and the anode active material layer 22B was formed by coating. In Examples 12-1 through 12-6, silicon was used as the anode active material, and the anode active material layer 22B was formed by an electron beam evaporation method. In Examples 13-1 through 13-6, silicon powder was used as the anode active material, and the anode active material layer 22B was formed by a firing method. Moreover, the amount of the anode active material was adjusted so that the charge capacity by the copper-tin alloy or silicon became larger than the charge capacity of the cathode 21, thereby the precipitation of 2-1 through 2-23 and 7-1 through 7-3, the secondary batteries were lithium-ion secondary batteries.

As the separator 23, a microporous polypropylene film with a thickness of 25 μm was used, and as the size of the separator 23, the separator 23 had a diameter of 14 mm and a height of 65 mm. As the electrolytic solution, an electrolytic solution formed by dissolving $LiPF_6$ as an electrolyte salt at a concentration of 1 mol/l in a solvent with a composition changed as shown in Tables 11 through 13 was used. As 4-fluoro-1,3-dioxolane-2-one and 4,5-difluoro-1,3-dioxolane-2-one, fluoro-1,3-dioxolane-2-one and 4,5-difluoro-1,3-dioxolane-2-one synthesized by the same methods as those in Examples 1-1 through 1-24 were used.

Moreover, as Comparative Examples 11-1 and 11-2 relative to Examples 11-1 through 11-5, Comparative Examples 12-1 and 12-2 relative to Examples 12-1 through 12-6, and Comparative Examples 13-1 and 13-2 relative to Examples 13-1 through 13-6, secondary batteries were formed as in the case of Examples 11-1 through 11-5, 12-1 through 12-6 and 13-1 through 13-6, except that 4,5-difluoro-1,3-dioxolane-2-one was not added, and the composition of the solvent was changed as shown in Tables 11 through 13.

Charge-discharge tests were performed on the secondary batteries of Examples 11-1 through 11-5, 12-1 through 12-6 and 13-1 through 13-6 and Comparative Examples 11-1, 11-2, 12-1, 12-2, 13-1 and 13-2 as in the case of Examples 1-1 through 1-24 to determine the high temperature storage characteristics and the high temperature cycle characteristics of the secondary batteries. At that time, after the secondary batteries were charged at a constant current of 600 mA until a battery voltage reached 4.2 V, the secondary batteries were charged at a constant voltage of 4.2 V until a current value reached 30 mA, and the secondary batteries were discharged at a constant current of 400 mA until a battery voltage reached 3.0 V. The results are shown in Tables 11 through 13.

TABLE 11

Anode active material; Cu—Sn alloy, Method of forming anode active material layer; coating

| | COMPOSITION OF SOLVENT | | | | | | CAPACITY RETENTION RATIO (%) | |
|---|---|---|---|---|---|---|---|---|
| | | | | | DFEC (vol ppm) | | AFTER HIGH | HIGH |
| | FEC (vol %) | EC (vol %) | DMC (vol %) | DEC (vol %) | TOTAL | CIS-ISOMER | TRANS-ISOMER | TEMPERATURE STORAGE | TEMPERATURE CYCLE |
| EXAMPLE 11-1 | 2 | 48 | 50 | 0 | 10 | 6 | 4 | 70 | 73 |
| EXAMPLE 11-2 | 10 | 40 | 50 | 0 | 25 | 10 | 15 | 80 | 81 |

TABLE 11-continued

Anode active material; Cu—Sn alloy, Method of forming anode active material layer; coating

| | COMPOSITION OF SOLVENT | | | | | | CAPACITY RETENTION RATIO (%) | |
|---|---|---|---|---|---|---|---|---|
| | | | | | DFEC (vol ppm) | | AFTER HIGH | HIGH |
| | FEC (vol %) | EC (vol %) | DMC (vol %) | DEC (vol %) | TOTAL | CIS-ISOMER | TRANS-ISOMER | TEMPERATURE STORAGE | TEMPERATURE CYCLE |
| EXAMPLE 11-3 | 30 | 20 | 50 | 0 | 100 | 60 | 40 | 82 | 83 |
| EXAMPLE 11-4 | 50 | 0 | 50 | 0 | 200 | 100 | 100 | 85 | 85 |
| EXAMPLE 11-5 | 70 | 0 | 30 | 0 | 250 | 100 | 150 | 85 | 86 |
| COMPARATIVE EXAMPLE 11-1 | 2 | 48 | 50 | 0 | 0 | 0 | 0 | 65 | 68 |
| COMPARATIVE EXAMPLE 11-2 | 10 | 40 | 50 | 0 | 0 | 0 | 0 | 67 | 70 |

FEC; 4-fluoro-1,3-dioxolane-2-one, EC; ethylene carbonate, DMC; dimethyl carbonate, DEC; diethyl carbonate, DFEC; 4,5-difluoro-1,3-dioxolane-2-one

TABLE 12

Anode active material; Si, Method of forming anode active material layer; electron beam

| | COMPOSITION OF SOLVENT | | | | | | | CAPACITY RETENTION RATIO (%) | |
|---|---|---|---|---|---|---|---|---|---|
| | | | | | | DFEC (vol ppm) | | AFTER HIGH | HIGH |
| | FEC (vol %) | EC (vol %) | DMC (vol %) | DEC (vol %) | TOTAL | CIS-ISOMER | TRANS-ISOMER | TEMPERATURE STORAGE | TEMPERATURE CYCLE |
| EXAMPLE 12-1 | 2 | 48 | 50 | 0 | 5 | 2.5 | 2.5 | 72 | 68 |
| EXAMPLE 12-2 | 10 | 40 | 50 | 0 | 25 | 10 | 15 | 85 | 80 |
| EXAMPLE 12-3 | 30 | 20 | 50 | 0 | 100 | 60 | 40 | 88 | 85 |
| EXAMPLE 12-4 | 50 | 0 | 50 | 0 | 200 | 100 | 100 | 88 | 85 |
| EXAMPLE 12-5 | 50 | 0 | 0 | 50 | 200 | 80 | 120 | 88 | 85 |
| EXAMPLE 12-6 | 70 | 0 | 30 | 0 | 250 | 100 | 150 | 88 | 84 |
| COMPARATIVE EXAMPLE 12-1 | 2 | 48 | 50 | 0 | 0 | 0 | 0 | 65 | 63 |
| COMPARATIVE EXAMPLE 12-2 | 10 | 40 | 50 | 0 | 0 | 0 | 0 | 67 | 65 |

FEC; 4-fluoro-1,3-dioxolane-2-one, EC; ethylene carbonate, DMC; dimethyl carbonate, DEC; diethyl carbonate, DFEC; 4,5-difluoro-1,3-dioxolane-2-one

TABLE 13

Anode active material; Si, Method of forming anode active material layer; firing

| | COMPOSITION OF SOLVENT | | | | | | | CAPACITY RETENTION RATIO (%) | |
|---|---|---|---|---|---|---|---|---|---|
| | | | | | | DFEC (vol ppm) | | AFTER HIGH | HIGH |
| | FEC (vol %) | EC (vol %) | DMC (vol %) | DEC (vol %) | TOTAL | CIS-ISOMER | TRANS-ISOMER | TEMPERATURE STORAGE | TEMPERATURE CYCLE |
| EXAMPLE 13-1 | 2 | 48 | 50 | 0 | 10 | 6 | 4 | 51 | 52 |
| EXAMPLE 13-2 | 10 | 40 | 50 | 0 | 25 | 10 | 15 | 61 | 66 |
| EXAMPLE 13-3 | 30 | 20 | 50 | 0 | 100 | 60 | 40 | 65 | 70 |
| EXAMPLE 13-4 | 50 | 0 | 50 | 0 | 200 | 100 | 100 | 68 | 71 |
| EXAMPLE 13-5 | 70 | 0 | 30 | 0 | 250 | 100 | 150 | 66 | 72 |
| EXAMPLE 13-6 | 50 | 0 | 0 | 50 | 200 | 100 | 100 | 68 | 71 |
| COMPARATIVE EXAMPLE 13-1 | 2 | 48 | 50 | 0 | 0 | 0 | 0 | 45 | 48 |
| COMPARATIVE EXAMPLE 13-2 | 10 | 40 | 50 | 0 | 0 | 0 | 0 | 47 | 50 |

FEC; 4-fluoro-1,3-dioxolane-2-one, EC; ethylene carbonate, DMC; dimethyl carbonate, DEC; diethyl carbonate, DFEC; 4,5-difluoro-1,3-dioxolane-2-one As shown in Tables 11 through 13, in Examples 11-1 through 11-5, 12-1 through 12-6 and 13-1 through 13-6, compared to Comparative Examples 11-1, 11-2, 12-1, 12-2, 13-1 and 13-2, the high temperature storage characteristics and the high temperature cycle characteristics could be improved. In other words, it was found out that even in a battery with another shape, when electrolytic solution included 4,5-difluoro-1,3-dioxolane-2-one, high temperature characteristics could be improved.

Examples 14-1 to 14-5

Secondary batteries were formed as in the case of Examples 11-1 through 11-5, except that the anode 22 was formed through the use of artificial graphite powder as the anode active material. As the solvent, 4-fluoro-1,3-dioxolane-2-one, ethylene carbonate, dimethyl carbonate, ethyl methyl carbonate, vinylene carbonate and 4,5-difluoro-1,3- dioxolane-2-one were prepared, and the contents of them were changed as shown in Table 14. Moreover, as Comparative Examples 14-1 through 14-4 relative to Examples 14-1 through 14-5, secondary batteries were formed as in the case of Examples 14-1 through 14-5, except that 4,5-difluoro-1,3-dioxolane-2-one was not added, and the composition of the solvent was changed as shown in Table 14.

Charge-discharge tests were performed on the secondary batteries of Examples 14-1 through 14-5 and Comparative Examples 14-1 through 14-4 as in the case of Examples 11-1 through 11-5 to determine the high temperature storage characteristics and the high temperature cycle characteristics of the secondary batteries. The results are shown in Table 14.

propylene (HFP) at a weight ratio of PVDF:HFP=93:7 was prepared, and the polymer material and the electrolytic solution were mixed through the use of a mixed solvent to form a precursor solution. As the electrolytic solution, an electrolytic solution formed by dissolving $LiPF_6$ as an electrolyte salt at a concentration of 1 mol/l in a solvent with a composition changed as shown in Table 15 was used. In Example 15-5, dimethyl carbonate was added later, and was not added in the precursor solution. Moreover, as 4-fluoro-1,3-dioxolane-2-one and 4,5-difluoro-1,3-dioxolane-2-one, 4-fluoro-1,3-dioxolane-2-one and 4,5-difluoro-1,3-dioxolane-2-one synthesized by the same methods as those in Examples 1-1 through 1-24 were used.

TABLE 14

Anode active material; artificial graphite, Method of forming anode active material layer; coating

| | COMPOSITION OF SOLVENT | | | | | | | CAPACITY RETENTION RATIO (%) | |
|---|---|---|---|---|---|---|---|---|---|
| | | | | | | DFEC (vol ppm) | | AFTER HIGH | HIGH |
| | FEC (vol %) | EC (vol %) | DMC (vol %) | EMC (vol %) | VC (vol %) | TOTAL | CIS-ISOMER | TRANS-ISOMER | TEMPERATURE STORAGE | TEMPERATURE CYCLE |
| EXAMPLE 14-1 | 5 | 30 | 0 | 65 | 0 | 50 | 25 | 25 | 88 | 89 |
| EXAMPLE 14-2 | 10 | 40 | 50 | 0 | 0 | 100 | 50 | 50 | 90 | 91 |
| EXAMPLE 14-3 | 10 | 40 | 50 | 0 | 0 | 500 | 250 | 250 | 90 | 91 |
| EXAMPLE 14-4 | 10 | 38 | 50 | 0 | 2 | 500 | 250 | 250 | 91 | 92 |
| EXAMPLE 14-5 | 15 | 35 | 30 | 20 | 0 | 500 | 250 | 250 | 90 | 91 |
| COMPARATIVE EXAMPLE 14-1 | 2 | 48 | 50 | 0 | 0 | 0 | 0 | 0 | 83 | 87 |
| COMPARATIVE EXAMPLE 14-2 | 10 | 40 | 50 | 0 | 0 | 0 | 0 | 0 | 85 | 88 |
| COMPARATIVE EXAMPLE 14-3 | 5 | 30 | 0 | 65 | 0 | 0 | 0 | 0 | 84 | 85 |
| COMPARATIVE EXAMPLE 14-4 | 15 | 35 | 0 | 50 | 0 | 0 | 0 | 0 | 85 | 86 |

FEC; 4-fluoro-1,3-dioxolane-2-one, EC; ethylene carbonate, DMC; dimethyl carbonate, EMC; ethyl methyl carbonate, VC; vinylene carbonate, DFEC; 4,5-difluoro-1,3-dioxolane-2-one As shown in Table 14, in Examples 14-1 through 14-5, compared to Comparative Examples 14-1 through 14-4, the high temperature storage characteristics and the high temperature cycle characteristics could be improved. In other words, it was found out that even in the case where a carbon material was used as the anode active material, when the electrolytic solution included 4,5-difluoro-1,3-dioxolane-2-one, irrespective of the battery shape, high temperature characteristics could be improved.

Examples 15-1 to 15-6

Laminate film type secondary batteries as shown in FIGS. 3 and 4 were formed. At first, the cathode 33 was formed as in the case of Examples 1-1 through 1-24. Moreover, the anode 34 was formed by forming the anode active material layer 34B made of silicon by an electron beam evaporation method as in the case of Examples 2-1 through 2-23. At that time, the amount of silicon was adjusted so that a charge capacity by silicon became larger than the charge capacity of the cathode 33, thereby the precipitation of lithium metal on the anode 34 during charge was prevented. In other words, the secondary batteries were lithium-ion secondary batteries as in the case of Examples 1-1 through 1-24 and 2-1 through 2-23.

Next, as a polymer material, a copolymer formed by copolymerizing polyvinylidene fluoride (PVDF) and hexafluoro- Next, the precursor solution was applied to both sides of the cathode 33 and the anode 34, and the mixed solvent was volatilized. After that, the cathode lead 31 made of aluminum was attached to the cathode 33, and the anode lead 32 made of nickel was attached to the anode 34, and after the cathode 33 and the anode 34 were laminated and spirally wound with the separator 35 made of a microporpous polyethylene film with a thickness of 25 μm, they were sealed in the package members 40 made of a laminate film under reduced pressure. In Example 15-5, before closing the package members 40, dimethyl carbonate was added in the package members 40.

Moreover, as Comparative Example 15-1 relative to Examples 15-1 through 15-6, a secondary battery was formed as in the case of Example 15-1, except that 4,5-difluoro-1,3-dioxolane-2-one was not added.

Charge-discharge tests were performed on the secondary batteries of Examples 15-1 through 15-6 and Comparative Example 15-1 as in the case of Examples 1-1 through 1-24 to determine the high temperature storage characteristics and the high temperature cycle characteristics of the secondary batteries. At that time, after the secondary batteries were charged at a constant current of 1 A until a battery voltage reached 4.2 V, the secondary batteries were charged at a constant voltage of 4.2 V until a current value reached 50 mA, and the secondary batteries were discharged at a constant current of 200 mA until a battery voltage reached 3.0 V. The results are shown in Table 15.

TABLE 15

Anode active material: Si, Method of forming anode active material layer: electron beam

| | COMPOSITION OF SOLVENT | | | | | | | CAPACITY RETENTION RATIO (%) | |
|---|---|---|---|---|---|---|---|---|---|
| | | | | | | DFEC (vol ppm) | | AFTER HIGH | HIGH |
| | FEC (vol %) | EC (vol %) | PC (vol %) | DMC (vol %) | TOTAL | CIS-ISOMER | TRANS-ISOMER | TEMPERATURE STORAGE | TEMPERATURE CYCLE |
| EXAMPLE 15-1 | 3 | 47 | 50 | 0 | 140 | 30 | 110 | 75 | 55 |
| EXAMPLE 15-2 | 10 | 40 | 50 | 0 | 10 | 6 | 4 | 86 | 67 |
| EXAMPLE 15-3 | 30 | 20 | 50 | 0 | 25 | 10 | 15 | 86 | 69 |
| EXAMPLE 15-4 | 50 | 0 | 50 | 0 | 100 | 60 | 40 | 87 | 71 |
| EXAMPLE 15-5 | 50 | 0 | 40 | 10 | 200 | 100 | 100 | 87 | 72 |
| EXAMPLE 15-6 | 70 | 0 | 30 | 0 | 250 | 100 | 150 | 87 | 72 |
| COMPARATIVE EXAMPLE 15-1 | 3 | 47 | 50 | 0 | 0 | 0 | 0 | 67 | 51 |

FEC; 4-fluoro-1,3-dioxolane-2-one, EC; ethylene carbonate, PC; propylene carbonate, DMC; dimethyl carbonate, DFEC; 4,5-difluoro-1,3-dioxolane-2-one As shown in Table 15, in Examples 15-1 through 15-6, compared to Comparative Example 15-1, the high temperature storage characteristics and the high temperature cycle characteristics could be improved. In other words, it was found out that even in the case where a gel electrolyte formed by holding the electrolytic solution by a polymer compound was used, when the electrolytic solution included 4,5-difluoro-1,3-dioxolane-2-one, high temperature characteristics could be improved.

Examples 16-1 to 16-19

Secondary batteries were formed as in the case of Examples 1-1 through 1-24, except that a CoSnC-containing material was used as the anode active material. The CoSnC-containing material was synthesized by mixing tin-cobalt-indium-titanium alloy powder and carbon powder, and using a mechanochemical reaction. When the composition of the obtained CoSnC-containing material was analysized, the content of tin was 48 wt %, the content of cobalt was 23 wt % and the content of carbon was 20 wt %. Moreover, the anode 52 was formed by mixing 80 parts by weight of the CoSnC-containing material, 11 parts by weight of graphite and 1 part by weight of acetylene black as electrical conductors and 8 parts by weight of polyvinylidene fluoride as a binder to form a mixture, dispersing the mixture in N-methyl-2-pyrrolidone as a solvent, and applying the mixture.

Moreover, as the solvent of the electrolytic solution, 4-fluoro-1,3-dioxolane-2-one, ethylene carbonate, propylene carbonate, dimethyl carbonate, ethyl methyl carbonate, diethyl carbonate and 4,5-difluoro-1,3-dioxolane-2-one were prepared, and the contents of them were changed as shown in Table 16. In the examples, the composition of the solvent is expressed in volume as a unit.

As Comparative Examples 16-1 through 16-4 relative to Examples 16-1 through 16-19, secondary batteries were formed as in the case of Examples 16-1 through 16-19, except that 4,5-difluoro-1,3-dioxolane-2-one was not added, and the composition of the solvent was changed as shown in Table 16.

Charge-discharge tests were performed on the secondary batteries of Examples 16-1 through 16-19 and Comparative Examples 16-1 through 16-4 as in the case of Examples 1-1 through 1-24 to determine the high temperature storage characteristics and the high temperature cycle characteristics of the secondary batteries. Moreover, 100 cycles of charge and discharge were repeated at 23° C. to determine the ratio of a discharge capacity in the 100th cycle to a discharge capacity in the second cycle, that is, (discharge capacity in the 100th cycle/discharge capacity in the second cycle)×100 as room temperature cycle characteristics. The conditions of charge and discharge were the same as those described in Examples 1-1 through 1-24. The obtained results are shown in Table 16.

TABLE 16

Anode active material: CoSnC-containing material

| | COMPOSITION OF SOLVENT (wt %) | | | | | | | | | CAPACITY RETENTION RATIO (%) | | |
|---|---|---|---|---|---|---|---|---|---|---|---|---|
| | | | | | | | | DFEC | | ROOM | AFTER HIGH | HIGH |
| | FEC | EC | PC | DMC | EMC | DEC | TOTAL | CIS-ISOMER | TRANS-ISOMER | TEMPERATURE CYCLE | TEMPERATURE STORAGE | TEMPERATURE CYCLE |
| EXAMPLE 16-1 | 0 | 0 | 0 | 0 | 0 | 50 | 50 | 0 | 50 | 94 | 68 | 69 |
| EXAMPLE 16-2 | 0 | 0 | 0 | 0 | 0 | 50 | 50 | 50 | 0 | 94 | 67 | 68 |
| EXAMPLE 16-3 | 0 | 0 | 0 | 0 | 0 | 50 | 50 | 25 | 25 | 94 | 68 | 69 |
| EXAMPLE 16-4 | 0 | 20 | 0 | 0 | 0 | 50 | 30 | 0 | 30 | 95 | 66 | 67 |
| EXAMPLE 16-5 | 0 | 20 | 0 | 0 | 0 | 50 | 30 | 30 | 0 | 94 | 65 | 68 |
| EXAMPLE 16-6 | 0 | 20 | 0 | 0 | 0 | 50 | 30 | 15 | 15 | 95 | 65 | 69 |
| EXAMPLE 16-7 | 0 | 40 | 0 | 0 | 0 | 50 | 10 | 0 | 10 | 94 | 62 | 65 |
| EXAMPLE 16-8 | 0 | 40 | 0 | 0 | 0 | 50 | 10 | 10 | 0 | 94 | 61 | 65 |
| EXAMPLE 16-9 | 0 | 40 | 0 | 0 | 0 | 50 | 10 | 5 | 5 | 94 | 62 | 66 |
| EXAMPLE 16-10 | 0 | 10 | 0 | 0 | 0 | 60 | 30 | 0 | 30 | 94 | 67 | 70 |
| EXAMPLE 16-11 | 0 | 0 | 10 | 0 | 0 | 60 | 30 | 0 | 30 | 94 | 68 | 71 |
| EXAMPLE 16-12 | 10 | 0 | 0 | 0 | 0 | 60 | 30 | 0 | 30 | 95 | 67 | 70 |
| EXAMPLE 16-13 | 0 | 10 | 0 | 60 | 0 | 0 | 30 | 0 | 30 | 94 | 62 | 65 |
| EXAMPLE 16-14 | 0 | 10 | 0 | 0 | 60 | 0 | 30 | 0 | 30 | 94 | 65 | 67 |

TABLE 16-continued

Anode active material; CoSnC-containing material

| | COMPOSITION OF SOLVENT (wt %) | | | | | | | | | CAPACITY RETENTION RATIO (%) | | |
|---|---|---|---|---|---|---|---|---|---|---|---|---|
| | | | | | | | | DFEC | | ROOM | AFTER HIGH | HIGH |
| | FEC | EC | PC | DMC | EMC | DEC | TOTAL | CIS-ISOMER | TRANS-ISOMER | TEMPERATURE CYCLE | TEMPERATURE STORAGE | TEMPERATURE CYCLE |
| EXAMPLE 16-15 | 0 | 0 | 10 | 60 | 0 | 0 | 30 | 0 | 30 | 94 | 63 | 67 |
| EXAMPLE 16-16 | 0 | 0 | 10 | 0 | 60 | 0 | 30 | 0 | 30 | 94 | 63 | 67 |
| EXAMPLE 16-17 | 25 | 0 | 10 | 0 | 0 | 60 | 5 | 0 | 5 | 95 | 67 | 68 |
| EXAMPLE 16-18 | 25 | 10 | 0 | 0 | 0 | 60 | 5 | 0 | 5 | 96 | 67 | 69 |
| EXAMPLE 16-19 | 45 | 0 | 0 | 0 | 0 | 50 | 5 | 0 | 5 | 96 | 67 | 68 |
| COMPARATIVE EXAMPLE 16-1 | 0 | 50 | 0 | 0 | 0 | 50 | 0 | 0 | 0 | 40 | 53 | 57 |
| COMPARATIVE EXAMPLE 16-2 | 50 | 0 | 0 | 0 | 0 | 50 | 0 | 0 | 0 | 93 | 59 | 64 |
| COMPARATIVE EXAMPLE 16-3 | 30 | 20 | 0 | 0 | 0 | 50 | 0 | 0 | 0 | 90 | 56 | 60 |
| COMPARATIVE EXAMPLE 16-4 | 10 | 40 | 0 | 0 | 0 | 50 | 0 | 0 | 0 | 85 | 55 | 58 |

FEC; 4-fluoro-1,3-dioxolane-2-one, EC; ethylene carbonate, PC; propylene carbonate, DMC; dimethyl carbonate, EMC; ethyl methyl carbonate, DEC; diethyl carbonate, DFEC; 4,5-difluoro-1,3-dioxolane-2-one As shown in Table 16, in Examples 16-1 through 16-19 in which 4,5-difluoro-1,3-dioxolane-2-one was added, compared to Comparative Examples 16-1 through 16-4 in which 4,5-difluoro-1,3-dioxolane-2-one was not added, the room temperature cycle characteristics, the high temperature storage characteristics and the high temperature cycle characteristics could be improved. Moreover, when the content of 4,5-difluoro-1,3-dioxolane-2-one was within a range from 5 wt % to 50 wt %, effects were shown. In other words, it was found out that the content of 4,5-difluoro-1,3-dioxolane-2-one was preferably within a range from 5 wt % to 50 wt % inclusive.

Examples 17-1 to 17-19

Secondary batteries were formed as in the case of Examples 1-1 through 1-24, except that silicon was used as the anode active material, and the anode active material layer 52B was formed by an electron beam evaporation method. At that time, the composition of the solvent in the electrolytic solution was changed as shown in Table 17 in Examples 17-1 through 17-19. In the examples, the composition of the solvent is expressed in volume as a unit. Moreover, as Comparative Examples 17-1 through 17-4 relative to Examples 17-1 through 17-19, secondary batteries were formed as in the case of Examples 17-1 through 17-19, except that 4,5-difluoro-1,3-dioxolane-2-one was not added, and the composition of the solvent was changed as shown in Table 17.

Charge-discharge tests were performed on the secondary batteries of Examples 17-1 through 17-19 and Comparative Examples 17-1 through 17-14 as in the case of Examples 1-1 through 1-24 to determine the high temperature storage characteristics and the high temperature cycle characteristics of the secondary batteries. Moreover, as in the case of Examples 16-1 through 16-19, the room temperature cycle characteristics of the secondary batteries were determined. The results are shown in Table 17.

TABLE 17

Anode active material; Si, Method of forming anode active material layer; electron beam

| | COMPOSITION OF SOLVENT (wt %) | | | | | | | | | CAPACITY RETENTION RATIO (%) | | |
|---|---|---|---|---|---|---|---|---|---|---|---|---|
| | | | | | | | | DFEC | | ROOM | AFTER HIGH | HIGH |
| | FEC | EC | PC | DMC | EMC | DEC | TOTAL | CIS-ISOMER | TRANS-ISOMER | TEMPERATURE CYCLE | TEMPERATURE STORAGE | TEMPERATURE CYCLE |
| EXAMPLE 17-1 | 0 | 0 | 0 | 0 | 0 | 50 | 50 | 0 | 50 | 78 | 65 | 64 |
| EXAMPLE 17-2 | 0 | 0 | 0 | 0 | 0 | 50 | 50 | 50 | 0 | 77 | 63 | 64 |
| EXAMPLE 17-3 | 0 | 0 | 0 | 0 | 0 | 50 | 50 | 25 | 25 | 77 | 65 | 65 |
| EXAMPLE 17-4 | 0 | 20 | 0 | 0 | 0 | 50 | 30 | 0 | 30 | 78 | 63 | 64 |
| EXAMPLE 17-5 | 0 | 20 | 0 | 0 | 0 | 50 | 30 | 30 | 0 | 78 | 62 | 62 |
| EXAMPLE 17-6 | 0 | 20 | 0 | 0 | 0 | 50 | 30 | 15 | 15 | 77 | 63 | 63 |
| EXAMPLE 17-7 | 0 | 40 | 0 | 0 | 0 | 50 | 10 | 0 | 10 | 78 | 58 | 60 |
| EXAMPLE 17-8 | 0 | 40 | 0 | 0 | 0 | 50 | 10 | 10 | 0 | 77 | 57 | 59 |
| EXAMPLE 17-9 | 0 | 40 | 0 | 0 | 0 | 50 | 10 | 5 | 5 | 78 | 58 | 60 |
| EXAMPLE 17-10 | 0 | 10 | 0 | 0 | 0 | 60 | 30 | 0 | 30 | 77 | 63 | 65 |
| EXAMPLE 17-11 | 0 | 0 | 10 | 0 | 0 | 60 | 30 | 0 | 30 | 77 | 64 | 66 |
| EXAMPLE 17-12 | 10 | 0 | 0 | 0 | 0 | 60 | 30 | 0 | 30 | 78 | 66 | 68 |
| EXAMPLE 17-13 | 0 | 10 | 0 | 60 | 0 | 0 | 30 | 0 | 30 | 77 | 62 | 64 |
| EXAMPLE 17-14 | 0 | 10 | 0 | 0 | 60 | 0 | 30 | 0 | 30 | 78 | 63 | 66 |
| EXAMPLE 17-15 | 0 | 0 | 10 | 60 | 0 | 0 | 30 | 0 | 30 | 77 | 61 | 63 |
| EXAMPLE 17-16 | 0 | 0 | 10 | 0 | 60 | 0 | 30 | 0 | 30 | 77 | 62 | 64 |
| EXAMPLE 17-17 | 25 | 0 | 10 | 0 | 0 | 60 | 5 | 0 | 5 | 79 | 60 | 64 |
| EXAMPLE 17-18 | 25 | 10 | 0 | 0 | 0 | 60 | 5 | 0 | 5 | 80 | 59 | 66 |

TABLE 17-continued

Anode active material; Si, Method of forming anode active material layer; electron beam

| | COMPOSITION OF SOLVENT (wt %) | | | | | | | | | CAPACITY RETENTION RATIO (%) | | |
|---|---|---|---|---|---|---|---|---|---|---|---|---|
| | | | | | | | | DFEC | | ROOM | AFTER HIGH | HIGH |
| | FEC | EC | PC | DMC | EMC | DEC | TOTAL | CIS-ISOMER | TRANS-ISOMER | TEMPERATURE CYCLE | TEMPERATURE STORAGE | TEMPERATURE CYCLE |
| EXAMPLE 17-19 | 45 | 0 | 0 | 0 | 0 | 50 | 5 | 0 | 5 | 82 | 60 | 60 |
| COMPARATIVE EXAMPLE 17-1 | 0 | 50 | 0 | 0 | 0 | 50 | 0 | 0 | 0 | 40 | 50 | 56 |
| COMPARATIVE EXAMPLE 17-2 | 50 | 0 | 0 | 0 | 0 | 50 | 0 | 0 | 0 | 76 | 55 | 60 |
| COMPARATIVE EXAMPLE 17-3 | 30 | 20 | 0 | 0 | 0 | 50 | 0 | 0 | 0 | 73 | 48 | 57 |
| COMPARATIVE EXAMPLE 17-4 | 10 | 40 | 0 | 0 | 0 | 50 | 0 | 0 | 0 | 70 | 45 | 56 |

FEC; 4-fluoro-1,3-dioxolane-2-one, EC; ethylene carbonate, PC; propylene carbonate, DMC; dimethyl carbonate, EMC; ethyl methyl carbonate, DEC; diethyl carbonate, DFEC; 4,5-difluoro-1,3-dioxolane-2-one As shown in Table 17, in Examples 17-1 through 17-19 in which 4,5-difluoro-1,3-dioxolane-2-one was added, compared to Comparative Examples 17-1 through 17-4 in which 4,5-difluoro-1,3-dioxolane-2-one was not added, the room temperature characteristics, the high temperature storage characteristics and the high temperature cycle characteristics could be improved. Moreover, when the content of 4,5-difluoro-1,3-dioxolane-2-one was within a range from 5 wt % to 50 wt %, effects were shown. In other words, it was found out that not only in the case where a material including tin as an element was used as the anode active material but also in the case where a material including silicon as an element was used, the content of 4,5-difluoro-1,3-dioxolane-2-one was preferably within a range from 5 wt % to 50 wt % inclusive.

Examples 18-1 to 18-19

Lithium metal secondary batteries in which the capacity of an anode was represented by a capacity component by precipitation and dissolution of lithium were formed as in the case of Examples 9-1 through 9-3. The composition of the solvent in the electrolytic solution was changed as shown in Table 18 in Examples 18-1 through 18-19. In the examples, the composition of the solvent is expressed in volume as a unit. Moreover, as Comparative Examples 18-1 through 18-4 relative to Examples 18-1 through 18-19, secondary batteries were formed as in the case of Examples 18-1 through 18-19, except that 4,5-difluoro-1,3-dioxolane-2-one was not added, and the composition of the solvent was changed as shown in Table 18.

Charge-discharge tests were performed on the secondary batteries of Examples 18-1 through 18-19 and Comparative Examples 18-1 through 18-4 as in the case of Examples 1-1 through 1-24 to determine the high temperature storage characteristics and the high temperature cycle characteristics of the secondary batteries. Moreover, as in the case of Examples 16-1 through 16-19, the room temperature cycle characteristics of the secondary batteries were determined. The results are shown in Table 18.

TABLE 18

Anode active material; Li metal

| | COMPOSITION OF SOLVENT (wt %) | | | | | | | | | CAPACITY RETENTION RATIO (%) | | |
|---|---|---|---|---|---|---|---|---|---|---|---|---|
| | | | | | | | | DFEC | | ROOM | AFTER HIGH | HIGH |
| | FEC | EC | PC | DMC | EMC | DEC | TOTAL | CIS-ISOMER | TRANS-ISOMER | TEMPERATURE CYCLE | TEMPERATURE STORAGE | TEMPERATURE CYCLE |
| EXAMPLE 18-1 | 0 | 0 | 0 | 0 | 0 | 50 | 50 | 0 | 50 | 70 | 88 | 80 |
| EXAMPLE 18-2 | 0 | 0 | 0 | 0 | 0 | 50 | 50 | 50 | 0 | 68 | 74 | 60 |
| EXAMPLE 18-3 | 0 | 0 | 0 | 0 | 0 | 50 | 50 | 25 | 25 | 70 | 84 | 75 |
| EXAMPLE 18-4 | 0 | 20 | 0 | 0 | 0 | 50 | 30 | 0 | 30 | 65 | 85 | 64 |
| EXAMPLE 18-5 | 0 | 20 | 0 | 0 | 0 | 50 | 30 | 30 | 0 | 63 | 73 | 62 |
| EXAMPLE 18-6 | 0 | 20 | 0 | 0 | 0 | 50 | 30 | 15 | 15 | 64 | 82 | 76 |
| EXAMPLE 18-7 | 0 | 40 | 0 | 0 | 0 | 50 | 10 | 0 | 10 | 60 | 78 | 73 |
| EXAMPLE 18-8 | 0 | 40 | 0 | 0 | 0 | 50 | 10 | 10 | 0 | 61 | 72 | 58 |
| EXAMPLE 18-9 | 0 | 40 | 0 | 0 | 0 | 50 | 10 | 5 | 5 | 58 | 80 | 75 |
| EXAMPLE 18-10 | 0 | 10 | 0 | 0 | 0 | 60 | 30 | 0 | 30 | 64 | 86 | 78 |
| EXAMPLE 18-11 | 0 | 0 | 10 | 0 | 0 | 60 | 30 | 0 | 30 | 62 | 85 | 79 |
| EXAMPLE 18-12 | 10 | 0 | 0 | 0 | 0 | 60 | 30 | 0 | 30 | 68 | 86 | 80 |
| EXAMPLE 18-13 | 0 | 10 | 0 | 60 | 0 | 0 | 30 | 0 | 30 | 65 | 80 | 68 |
| EXAMPLE 18-14 | 0 | 10 | 0 | 0 | 60 | 0 | 30 | 0 | 30 | 64 | 83 | 75 |
| EXAMPLE 18-15 | 0 | 0 | 10 | 60 | 0 | 0 | 30 | 0 | 30 | 63 | 82 | 79 |
| EXAMPLE 18-16 | 0 | 0 | 10 | 0 | 60 | 0 | 30 | 0 | 30 | 63 | 84 | 77 |
| EXAMPLE 18-17 | 25 | 0 | 10 | 0 | 0 | 60 | 5 | 0 | 5 | 65 | 88 | 80 |
| EXAMPLE 18-18 | 25 | 10 | 0 | 0 | 0 | 60 | 5 | 0 | 5 | 65 | 86 | 78 |
| EXAMPLE 18-19 | 45 | 0 | 0 | 0 | 0 | 50 | 5 | 0 | 5 | 64 | 82 | 77 |

TABLE 18-continued

Anode active material; Li metal

| | COMPOSITION OF SOLVENT (wt %) | | | | | | | | CAPACITY RETENTION RATIO (%) | | |
|---|---|---|---|---|---|---|---|---|---|---|---|
| | | | | | | | DFEC | | ROOM | AFTER HIGH | HIGH |
| | FEC | EC | PC | DMC | EMC | DEC | TOTAL | CIS-ISOMER | TRANS-ISOMER | TEMPERATURE CYCLE | TEMPERATURE STORAGE | TEMPERATURE CYCLE |
| COMPARATIVE EXAMPLE 18-1 | 0 | 50 | 0 | 0 | 0 | 50 | 0 | 0 | 0 | 40 | 65 | 50 |
| COMPARATIVE EXAMPLE 18-2 | 50 | 0 | 0 | 0 | 0 | 50 | 0 | 0 | 0 | 50 | 71 | 55 |
| COMPARATIVE EXAMPLE 18-3 | 30 | 20 | 0 | 0 | 0 | 50 | 0 | 0 | 0 | 43 | 68 | 55 |
| COMPARATIVE EXAMPLE 18-4 | 10 | 40 | 0 | 0 | 0 | 50 | 0 | 0 | 0 | 42 | 68 | 53 |

FEC; 4-fluoro-1,3-dioxolane-2-one, EC; ethylene carbonate, PC; propylene carbonate, DMC; dimethyl carbonate, EMC; ethyl methyl carbonate, DEC; diethyl carbonate, DFEC; 4,5-difluoro-1,3-dioxolane-2-one As shown in Table 18, in Examples 18-1 through 18-19 in which 4,5-difluoro-1,3-dioxolane-2-one was added, compared to Comparative Examples 18-1 through 18-4 in which 4,5-difluoro-1,3-dioxolane-2-one was not added, the room temperature characteristics, the high temperature storage characteristics and the high temperature cycle characteristics could be improved. Moreover, when the content of 4,5-difluoro-1,3-dioxolane-2-one was within a range from 5 wt % to 50 wt %, effects were shown. In other words, it was found out that even in the lithium metal secondary battery using lithium metal as the anode active material, the content of 4,5-difluoro-1,3-dioxolane-2-one was preferably within a range from 5 wt % to 50 wt % inclusive.

Examples 19-1 to 19-4

Secondary batteries were formed as in the case of Examples 1-1 through 1-24, except that the anode 52 was formed through the use of artificial graphite powder as the anode active material. At that time, the composition of the solvent in the electrolytic solution was changed as shown in Table 19 in Examples 19-1 through 19-4. In the examples, the composition of the solvent is expressed in volume as a unit. Moreover, as Comparative Examples 19-1 and 19-2 relative to Examples 19-1 through 19-4, secondary batteries were formed as in the case of Examples 19-1 through 19-4, except that 4,5-difluoro-1,3-dioxolane-2-one was not added, and the composition of the solvent was changed as shown in Table 19.

Charge-discharge tests were performed on the secondary batteries of Examples 19-1 through 19-4 and Comparative Examples 19-1 and 19-2 as in the case of Examples 1-1 through 1-24 to determine the high temperature storage characteristics and the high temperature cycle characteristics of the secondary batteries. Moreover, as in the case of Examples 16-1 through 16-19, the room temperature cycle characteristics of the secondary batteries were determined. The results are shown in Table 19.

TABLE 19

Anode active material; artificial graphite, Method of forming anode active material layer; coating

| | COMPOSITION OF SOLVENT (wt %) | | | | | | | CAPACITY RETENTION RATIO (%) | | |
|---|---|---|---|---|---|---|---|---|---|---|
| | | | | | | DFEC | | ROOM | AFTER HIGH | HIGH |
| | FEC | EC | PC | DEC | TOTAL | CIS-ISOMER | TRANS-ISOMER | TEMPERATURE CYCLE | TEMPERATURE STORAGE | TEMPERATURE CYCLE |
| EXAMPLE 19-1 | 0 | 0 | 0 | 50 | 50 | 0 | 50 | 91 | 65 | 51 |
| EXAMPLE 19-2 | 0 | 20 | 0 | 50 | 30 | 0 | 30 | 90 | 64 | 50 |
| EXAMPLE 19-3 | 0 | 40 | 0 | 50 | 10 | 0 | 10 | 89 | 64 | 51 |
| EXAMPLE 19-4 | 25 | 0 | 10 | 60 | 5 | 0 | 5 | 90 | 63 | 50 |
| COMPARATIVE EXAMPLE 19-1 | 0 | 50 | 0 | 50 | 0 | 0 | 0 | 85 | 55 | 43 |
| COMPARATIVE EXAMPLE 19-2 | 50 | 0 | 0 | 50 | 0 | 0 | 0 | 90 | 62 | 50 |

FEC; 4-fluoro-1,3-dioxolane-2-one, EC; ethylene carbonate, PC; propylene carbonate, DEC; diethyl carbonate, DFEC; 4,5-difluoro-1,3-dioxolane-2-one As shown in Table 19, in Examples 19-1 through 19-4 in which 4,5-difluoro-1,3-dioxolane-2-one was added, compared to Comparative Examples 19-1 and 19-2 in which 4,5-difluoro-1,3-dioxolane-2-one was not added, the room temperature cycle characteristics, the high temperature storage characteristics and the high temperature cycle characteristics could be improved. However, the degree of improvement was lower than that in Examples 16-1 through 16-19 and 17-1 through 17-19 in which a material including tin or silicon as an element was used as the anode active material and Examples 18-1 through 18-19 in which lithium metal was used as the anode active material.

Example 20-1

A laminate film type secondary battery shown in FIGS. 3 and 4 was formed as in the case of Examples 15-1 through 15-6. The composition of the solvent in the electrolytic solution was changed as shown in Table 20. In the example, the composition of the solvent is expressed in volume as a unit.

Moreover, as Comparative Example 20-1 relative to Example 20-1, a secondary battery was formed as in the case of Example 20-1, except that 4-fluoro-1,3-dioxolane-2-one was used instead of 4,5-difluoro-1,3-dioxolane-2-one.

Charge-discharge tests were performed on the secondary batteries of Example 20-1 and Comparative Example 20-1 as in the case of Examples 15-1 through 15-6 to determine the high temperature storage characteristics and the high temperature cycle characteristics of the secondary batteries. Moreover, 100 cycles of charge and discharge were repeated at 23° C. to determine the ratio of a discharge capacity in the 100th cycle to a discharge capacity in the second cycle as room temperature cycle characteristics. The obtained results are shown in Table 20.

TABLE 20

Anode active material; Si, Method of forming anode active material layer; electron beam

| | COMPOSITION OF SOLVENT (wt %) | | | | | CAPACITY RETENTION RATIO (%) | | |
|---|---|---|---|---|---|---|---|---|
| | | | | DFEC | | ROOM | AFTER HIGH | HIGH |
| | FEC | PC | TOTAL | CIS-ISOMER | TRANS-ISOMER | TEMPERATURE CYCLE | TEMPERATURE STORAGE | TEMPERATURE CYCLE |
| EXAMPLE 20-1 | 0 | 50 | 50 | 0 | 50 | 77 | 79 | 63 |
| COMPARATIVE EXAMPLE 20-1 | 50 | 50 | 0 | 0 | 0 | 75 | 60 | 45 |

FEC; 4-fluoro-1,3-dioxolane-2-one, PC; propylene carbonate, DFEC; 4,5-difluoro-1,3-dioxolane-2-one As shown in Table 20, in Example 20-1, compared to Comparative Example 20-1, the room temperature characteristics, the high temperature storage characteristics and the high temperature cycle characteristics could be improved. In other words, it was found out that even in the case where a gel electrolyte formed by holding the electrolytic solution by a polymer compound was used, the content of 4,5-difluoro-1,3-dioxolane-2-one was preferably within a range from 5 wt % to 50 wt % inclusive.

Although the present invention is described referring to the embodiment and the examples, the invention is not limited to them, and can be variously modified. For example, in the above-described embodiment and the above-described examples, the case where the polymer material is used as a holding body is described; however, an inorganic conductor including lithium nitride or lithium phosphate may be used a holding body, or a mixture of a polymer material and an inorganic conductor may be used.

Moreover, in the above-described embodiment and the above-described examples, the battery using lithium as an electrode reactant is described; however, the invention is applicable to the case where another alkaline metal such as sodium (Na) or potassium (K), alkaline-earth metal such as magnesium or calcium (Ca), or another light metal such as aluminum is used. At this time, as the anode active material, for example, the same material as that in the above-described embodiment can be used.

Further, in the above-described embodiment, the cylindrical type secondary battery and the secondary battery using a package member such as a laminate film are described in detail, and in the above-described examples, the coin type secondary battery is described; however, the invention is applicable to a secondary battery with any other shape such as a button type or a prismatic type, or a secondary battery with any other structure such as a laminate structure in the same manner. In addition, the invention is applicable to not only the secondary batteries but also primary batteries in the same manner.

The invention claimed is:

1. An electrolytic solution comprising a solvent, the solvent including 4,5-difluoro-1,3-dioxolane-2-one and 4-fluoro-1,3-dioxolane-2-one, wherein:
   the content of 4,5-difluoro-1,3-dioxolane-2-one in the solvent is within the range from 5 wt % to 50 wt %, inclusive, and
   the content of 4-fluoro--1,3-dioxolane-2-one in the solvent is 45 wt % or less.

2. The electrolytic solution according to claim 1, wherein the 4,5-difluoro-1,3-dioxolane-2-one includes both a cis-isomer and a trans-isomer.

3. The electrolytic solution according to claim 1, wherein the solvent is selected from the group consisting of dimethyl carbonate, diethyl carbonate, and methyl ethyl carbonate.

4. A battery comprising:
   a cathode;
   an anode; and
   an electrolyte solution,
   wherein,
      the electrolyte solution includes a solvent, and the solvent comprises the 4,5-difluoro-1,3-dioxolane-2-one and 4-fluoro-1,3-dioxolane-2-one,
      the content of 4,5-difluoro-1,3-dioxolane-2-one in the solvent is within the range from 5 wt % to 50 wt %, inclusive, and
      the content of 4-fluoro--1,3-dioxolane-2-one in the solvent is 45 wt % or less.

5. The battery according to claim 4, wherein, the 4,5-difluoro-1,3-dioxolane-2-one includes both a cis-isomer and a trans-isomer.

6. The battery according to claim 4, wherein the anode includes an anode current collector and an anode active material layer, the anode active material layer being arranged on the anode current collector, and being alloyed with the anode current collector in at least a part of an interface with the anode current collector.

7. The battery according to claim 4, wherein the anode includes an anode current collector and an anode active material layer, the anode active material layer being formed by at least one method selected from the group consisting of a vapor-phase deposition method, a liquid-phase deposition method and a firing method.

8. The battery according to claim 4, wherein the anode includes lithium metal.

9. The battery according to claim 4, wherein the anode includes a carbon material.

10. The battery according to claim 4, wherein the solvent is selected from the group consisting of dimethyl carbonate, diethyl carbonate, and methyl ethyl carbonate.

11. The battery according to claim 4, further comprising a holding body, wherein:
the holding body is effective to hold the anode, the cathode, and the electrolytic solution, and
the holding body comprises a fluorine based polymer.

12. The battery according to claim 4, wherein the anode includes a material including at least one of silicon (Si) and tin (Sn) as an element.

13. An electrolytic solution comprising:
a solvent, the solvent including 4,5-difluoro-1,3-dioxolane-2-one and 4-fluoro-1,3-dioxolane-2-one,
wherein,
the content of 4,5-difluoro-1,3-dioxolane-2-one in the solvent is within the range from 5 vol ppm to 2000 vol ppm, and
the content of 4-fluoro--1,3-dioxolane-2-one in the solvent is 70 volume % or less.

14. The electrolytic solution according to claim 13, wherein the 4,5-difluoro-1,3-dioxolane-2-one includes both a cis-isomer and a trans-isomer.

15. The electrolytic solution according to claim 13, wherein the solvent is selected from the group consisting of dimethyl carbonate, diethyl carbonate, and methyl ethyl carbonate.

16. The electrolyte solution according to claim 13 wherein the solvent is a low-viscosity solvent having a viscosity of 1 mPas or less.

17. The electrolyte solution according to claim 13, wherein the content of 4,5-difluoro-1,3-dioxolane-2-one in the solvent is within a range from 5 vol. ppm to 500 vol. ppm inclusive.

18. The electrolyte solution according to claim 13, further comprising two or less salts selected from the group consisting of lithium hexafluorophosphate ($LiPF_6$), lithium tetrafluoroborate ($LiBF_4$), lithium hexafluoroarsenate ($LiAsF_6$), lithium perchlorate ($LiClO_4$), lithium trifluoromethanesulfonate ($LiCF_3 SO_3$), lithium bis[trifluoromethane sulfonyl]imide (($CF_3 SO_2)_2NLi$), lithium tris(trifluoromethanesulfonyl)methide (($CF_3 SO_2)_3CLi$), lithium tris(pentafluoroethyl)trifluorophosphate ($LiP(C_2 F_5)_3F_3$), lithium (trifluoromethyl)trifluoroborate ($LiB(CF_3)F_3$), lithium pentafluoroethyl trifluoroborate ($LiB(C_2 F_5)F_3$), lithium bis(oxalato)borate, lithium difluoro(oxalato)borate, lithium bis[pentafluoroethane sulfonyl]imide(($C_2 F_5 SO_2)_2NLi$), lithium 1,1,2,2,3,3-hexafluoropropane-1,3-disulfonimide, lithium trifluoromethyl pentafluoropropyl imide, and lithium trifluoromethyl nonafluorobutyl imide.

19. A battery comprising:
a cathode;
an anode; and
an electrolyte solution,
wherein,
the electrolyte solution includes a solvent, and the solvent comprises the 4,5-difluoro-1,3-dioxolane-2-one and 4-fluoro-1,3-dioxolane-2-one,
the content of 4,5-difluoro-1,3-dioxolane-2-one in the solvent is within the range from 5 vol ppm to 2000 vol ppm, inclusive, and
the content of 4-fluoro--1,3-dioxolane-2-one in the solvent is 70 volume % or less.

20. The battery according to claim 19, wherein the anode includes an anode current collector and an anode active material layer, the anode active material layer being arranged on the anode current collector, and being alloyed with the anode current collector in at least a part of an interface with the anode current collector.

21. The battery according to claim 19, wherein the anode includes an anode current collector and an anode active material layer, the anode active material layer being formed by at least one method selected from the group consisting of a vapor-phase deposition method, a liquid-phase deposition method and a firing method.

22. The battery according to claim 19, wherein the anode includes lithium metal.

23. The battery according to claim 19, wherein the anode includes a carbon material.

24. The battery according to claim 19, wherein the anode includes a material including at least one of silicon (Si) and tin (Sn) as an element 25. The battery according to claim 19, further comprising a holding body, wherein:
the holding body is effective to hold the anode, the cathode, and the electrolytic solution, and
the holding body comprises a fluorine based polymer.

26. The battery according to claim 19, wherein the 4,5-difluoro-1,3-dioxolane-2-one includes both a cis-isomer and a trans-isomer.

27. The battery according to claim 19, wherein the solvent is selected from the group consisting of dimethyl carbonate, diethyl carbonate, and methyl ethyl carbonate.

28. The battery according to claim 19 wherein the solvent is a low-viscosity solvent having a viscosity of 1 mPas or less.

29. The battery according to claim 19, wherein the content of 4,5-difluoro-1,3-dioxolane-2-one in the solvent is within a range from 5 vol. ppm to 500 vol. ppm inclusive.

30. The batter according to claim 19, further comprising two or less salts selected from the group consisting of lithium hexafluorophosphate ($LiPF_6$), lithium tetrafluoroborate ($LiBF_4$), lithium hexafluoroarsenate ($LiAsF_6$), lithium perchlorate ($LiClO_4$), lithium trifluoromethanesulfonate ($LiCF_3 SO_3$), lithium bis[trifluoromethane sulfonyl]imide (($CF_3 SO_2)_2NLi$), lithium tris(trifluoromethanesulfonyl)methide (($CF_3 SO_2)_3CLi$), lithium tris(pentafluoroethyl)trifluorophosphate ($LiP(C_2 F_5)_3F_3$), lithium (trifluoromethyl)trifluoroborate ($LiB(CF_3)F_3$), lithium pentafluoroethyl trifluoroborate ($LiB(C_2 F_5)F_3$), lithium bis(oxalato)borate, lithium difluoro(oxalato)borate, lithium bis[pentafluoroethane sulfonyl]imide(($C_2 F_5 S0_2)_2NLi$), lithium 1,1,2,2,3,3-hexafluoropropane-1,3-disulfonimide, lithium trifluoromethyl pentafluoropropyl imide, and lithium trifluoromethyl nonafluorobutyl imide.

* * * * *